United States Patent
Loberger

(10) Patent No.: US 8,049,661 B1
(45) Date of Patent: Nov. 1, 2011

(54) ANTENNA ARRAY WITH ROBUST FAILED-ELEMENT PROCESSOR

(75) Inventor: David G. Loberger, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1020 days.

(21) Appl. No.: 11/940,571

(22) Filed: Nov. 15, 2007

(51) Int. Cl.
*G01S 7/40* (2006.01)

(52) U.S. Cl. .................. 342/173; 342/174; 342/159

(58) Field of Classification Search .............. 342/173, 342/174, 81, 82, 157, 158, 159, 162
See application file for complete search history.

(56) References Cited

U.S. PATENT DOCUMENTS

| | | | |
|---|---|---|---|
| 4,338,605 A * | 7/1982 | Mims | 342/373 |
| 4,359,740 A | 11/1982 | Frazita | |
| 4,623,381 A | 11/1986 | Jahn et al. | |
| 4,926,186 A | 5/1990 | Kelly et al. | |
| 5,017,928 A * | 5/1991 | Haupt et al. | 342/379 |
| 5,113,194 A * | 5/1992 | Krikorian et al. | 342/106 |
| 5,276,452 A * | 1/1994 | Schuss et al. | 342/371 |
| 5,512,900 A | 4/1996 | Parkin et al. | |
| 6,140,976 A | 10/2000 | Locke et al. | |
| 6,339,398 B1 * | 1/2002 | Redvik et al. | 342/372 |
| 7,375,676 B1 * | 5/2008 | Loberger | 342/160 |
| 7,443,337 B2 * | 10/2008 | Jaklitsch | 342/195 |
| 7,728,764 B2 * | 6/2010 | Lok et al. | 342/159 |
| 2008/0074155 A1 * | 3/2008 | Jaklitsch | 327/105 |
| 2008/0143562 A1 * | 6/2008 | Huang et al. | 341/118 |
| 2009/0102717 A1 * | 4/2009 | Lok et al. | 342/379 |
| 2009/0243931 A1 * | 10/2009 | Weckerle et al. | 342/372 |
| 2011/0025545 A1 * | 2/2011 | Cook et al. | 342/22 |

\* cited by examiner

*Primary Examiner* — John Sotomayor
(74) *Attorney, Agent, or Firm* — Howard IP Law Group, PC

(57) ABSTRACT

An array antenna has elements spaced less than one-half wavelength in order to produce a spatial pattern which has both visible and invisible regions. The elements in their nominal state are weighted so as to define particular sidelobe levels. In the presence of failed elements which might otherwise degrade the sidelobe levels, the element weighting function is compensated so as to preserve the sidelobe levels within the visible region of the antenna pattern by placing most or all of the degradation of the sidelobe levels into the invisible region of the antenna pattern.

20 Claims, 21 Drawing Sheets

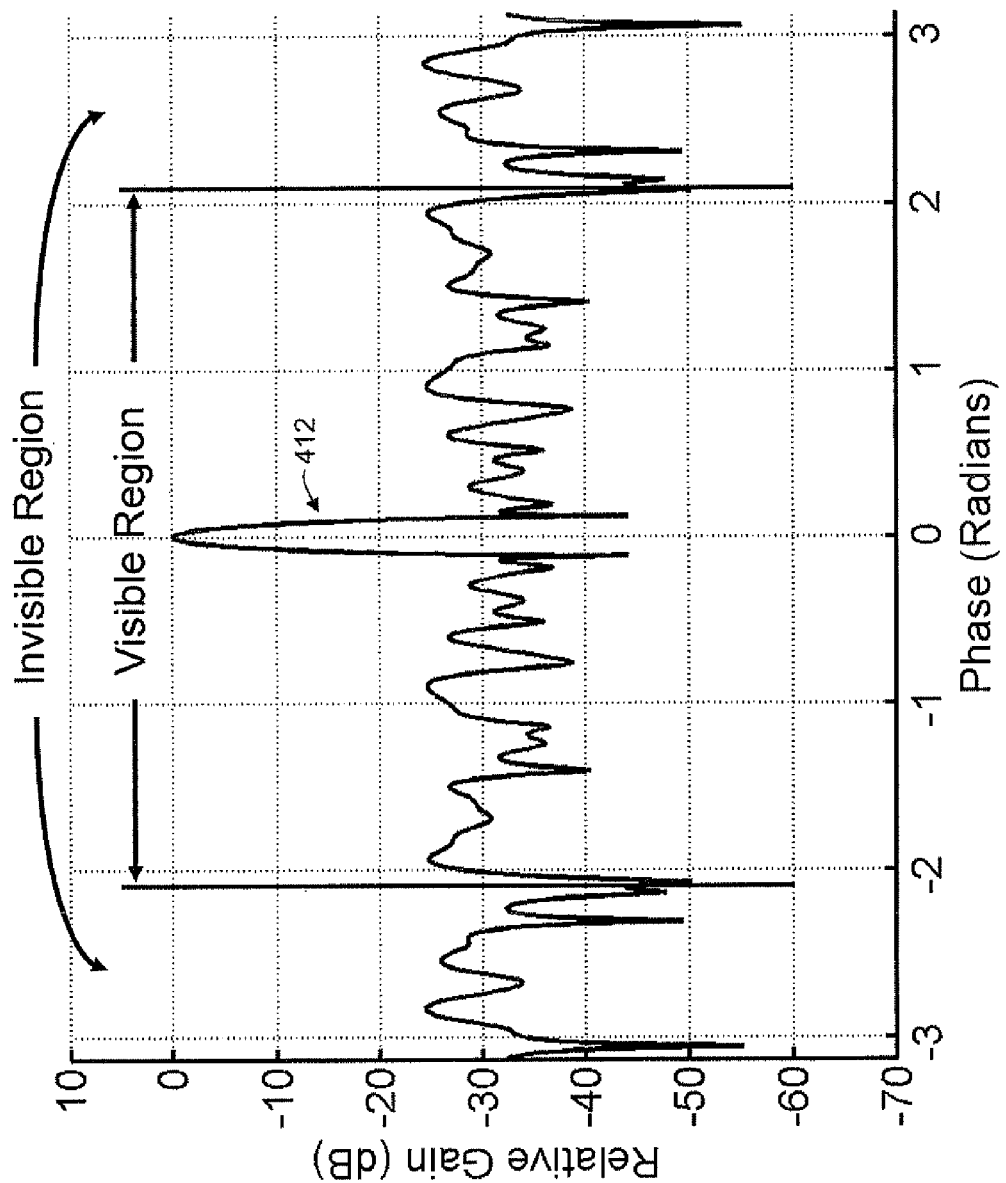

|  $g_{1N}$ | $g_{2N}$ | $g_{3N}$ | $\cdots$ | $g_{MN}$ |
|---|---|---|---|---|
| $\vdots$ | $\vdots$ | $\vdots$ |  | $\vdots$ |
| $g_{13}$ | $g_{23}$ | $g_{33}$ | $\cdots$ | $g_{M3}$ |
| $g_{12}$ | $g_{22}$ | $g_{32}$ | $\cdots$ | $g_{M2}$ |
| $g_{11}$ | $g_{21}$ | $g_{31}$ | $\cdots$ | $g_{M1}$ |

| $hc_1$ | $hc_2$ | $hc_3$ | $\cdots$ | $hc_N$ |
|---|---|---|---|---|

| $h_1$ | $h_2$ | $h_3$ | $\cdots$ | $h_N$ |
|---|---|---|---|---|

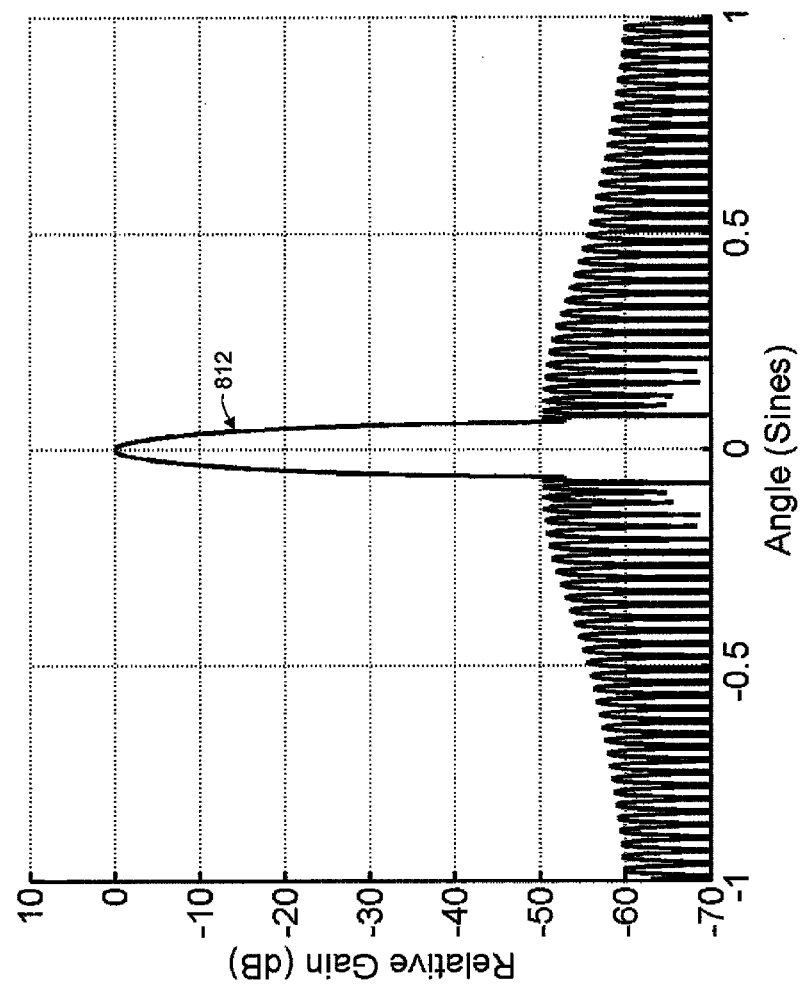

ANTENNA ARRAY WITH ROBUST FAILED-ELEMENT PROCESSOR

FIELD OF THE INVENTION

This invention relates generally to the field of array antennas, and more particularly to antenna array processors which accommodate failed antenna elements.

BACKGROUND OF THE INVENTION

Those skilled in the arts of antennas, antenna arrays and beamformers know that antennas are transducing devices which transduce electromagnetic energy between unguided- and guided-wave forms. More particularly, the unguided form of electromagnetic energy is that propagating in "free space," while guided electromagnetic energy follows a path established by a "transmission line". Transmission lines include coaxial cables, rectangular and circular hollow waveguides, dielectric microstrip or stripline paths, and the like. Historically, the guided-wave port of an antenna has been termed a "feed" port, regardless of whether the antenna operates for signal transmission or reception. The beam characteristics of an antenna are established, in part, by the sizes of the radiating portions of the antenna relative to the wavelength of the electromagnetic signal. In general, small antennas produce broad or nondirective beams, and large antennas produce small, narrow or directive beams. When more directivity (larger gain and/or narrower beamwidth) is desired than can be achieved from a single antenna, several antennas may be grouped together into an "array" and fed together in a phase-controlled manner, in order to generate the beam characteristics of an antenna which is larger than that of any single antenna element. The devices which control the phases and apportionment of signals to (or from) the antenna transducing elements are termed "beamformers." In general, a beamformer includes at least one feed port and a plurality of element ports. In a transmit mode, the signal is applied to the feed port and is distributed by the beamformer to the antenna transducing elements for transmission as an unguided electromagnetic signal in free space. In a receive mode, the unguided electromagnetic signals in free space are received by the antenna transducing elements and are combined in the beamformer to produce a signal at the feed port. A salient advantage of sophisticated beamformers is that they may include a plurality of feed ports, each of which distributes the electromagnetic signal in such a fashion that a plurality of different antenna beams may be generated simultaneously.

Array antennas are well known for various communication and sensing applications, and exhibit advantages over shaped-reflector antennas in that scanning (changing the pointing direction) of the beam or beams may be performed essentially instantaneously by electronic means, without inertia problems associated with moving a shaped reflector which has mass. In order to perform its role of setting the direction of the beam of an antenna array, a beamformer must set the element-to-element phase shifts of the individual signals being transduced by the array of transducing elements. So long as the beam direction or shape does not have to be changed during the operation of the antenna, fixed phase shifting devices may be used in the beamformer. Fixed phase shifting devices may be passive electronic devices which are ordinarily very reliable. When the direction or shape of the antenna beam must be changed during the operation of the antenna, controllable phase shifting devices may be used in the beamformer. Controllable phase shifting devices may be analog or digitally controlled devices. Currently available phase shifting device designs prefer multibit digitally controlled types because they can be controlled by simple digital signals, and because the amounts of phase shift can be quickly and accurately set. Controllable phase shifting devices may be active electronic devices, whether analog or digital, which are more subject to failure than are electronically passive phase shifting devices.

"Active array" antennas may have both a power amplifier and a low-noise amplifier associated with each transducing element. In a transmission mode, the beamformer distributes low-amplitude signals which are amplified by the associated power amplifiers and then are transmitted into free space by the transducing elements. The distribution of signals at low-amplitudes in the beamformer during transmission mode is desirable because it avoids ohmic heating losses which would otherwise occur in the beamformer if high power signals were distributed. In a reception mode, the signals received by each transducing element are amplified by the associated low-noise amplifiers prior to being combined in the beamformer. The amplification of the signals prior to combining them in the beamformer during reception mode is desirable because it establishes the receiver noise figure prior to incurring ohmic losses in the beamformer.

Control of the beam of an array antenna may involve "weighting" of the relative amplitudes of the signals which are applied to (or received by) the antenna transducing elements. The purposes for weighting are to establish the directivity and shape of the main beam of the antenna spatial pattern and also to establish the levels of the sidelobes (unwanted subsidiary lobes). A uniform weighting provides each antenna transducing element of the array with equal weight, meaning that in a transmission mode of operation all antenna transducing elements are provided with equal amplitude signals, and in a receive mode of operation equal amplitude signals from the individual antenna transducing elements are combined in the beamformer. Uniform weighting may be desirable when maximum directivity or antenna gain is desired. However, uniform weighting tends to produce high sidelobe levels, which are about −13 dB to −18 dB (deciBels) relative to the peak directivity of the main beam. Sidelobes (unwanted subsidiary lobes) are an inherent characteristic of directive array antennas which consist of multiple transducing elements, and may cause the transmission of power in directions other than the desired direction, or may also cause the reception of signals from directions other than the desired direction. Such transmissions in undesired directions may cause mutual interference to other antennas in close proximity, may enable the detection of the source of the signals by hostile forces, and may also cause a waste of transmitter power. The reception of signals from undesired directions may expose the antenna to mutual interference from other signal sources within close proximity and to jamming by hostile forces. The prior art controls the sidelobe levels of an array antenna by weighting or adjusting the array weighting function. Examples of prior art weighting functions which produce low sidelobe levels in the absence of transducing element failures include raised-cosine weighting, Dolph-Tschebyscheff weighting, and Taylor weighting functions. Weighting in an array antenna is ordinarily a function of the beamformer. Weighting of the levels of signals in the beamformer may be accomplished by signal attenuators and/or by power dividers (or power combiners in receive mode) which are selected to give the desired weighting. For some applications, variable gain or attenuation may be used and controlled in order to rapidly change the beam pointing direction, shape or other antenna pattern characteristics such as sidelobe levels.

Each transducing element of an array antenna may be associated with a "power" amplifier for use in a transmit mode, a "low-noise" amplifier for use in a receive mode, and a phase shifting device or devices for use in both transmit and receive modes. The power amplifier, the low-noise amplifier, and the phase shifting device or devices which are associated with each antenna element are often combined into a "transmit-receive" (TR) module. This module, in addition to containing the amplifiers and phase shifting device or devices, may also contain controllable gain devices, radio-frequency (RF) switches for switching between transmit and receive modes of operation, controls for the switches, and power supplies for the various controls and active electronic devices. The power amplifiers, low-noise amplifiers, digitally controlled phase shifting devices, and other active electronic devices which are contained in the TR modules, notwithstanding efforts to improve-reliability, may be subject to various forms of failure.

In the past, the term "radio frequency" was interpreted to mean a limited range of electromagnetic frequencies, such as, for example, the range extending from about 20 KHz to 2 MHz. Currently, the term "radio frequencies" as now understood extends over the higher electromagnetic frequency spectrum, including those frequencies in the "microwave" and "millimeter-wave" regions. Many of these electromagnetic frequencies are very important for military and commercial purposes, as they include the frequencies at which radar systems, global positioning systems, satellite cellular communications and ordinary terrestrial cellphone systems operate.

The failure of a TR module generally stops the operation of the associated antenna transducing element, and may be viewed as being a failure of the antenna transducing element itself. Failures in the TR modules of an array antenna may occur, in general, in the transmit signal path, in the receive signal path, and/or in the phase shifting device signal or control paths. Thus, in a transmit mode of operation, different transducing elements of the antenna array may fail than fail in a receive mode of operation. Prior art weighting functions are designed for array antennas in which all antenna transducing elements are operational. Failures of one or more transducing elements of an array may significantly degrade the antenna sidelobe levels which are obtained with prior art weighting functions.

Thus, active array antennas, such as are currently being used and which will be used in future radar, communication and commercial applications, provide significant performance benefits relative to passive array antennas. The placement of a TR module close to each transducing element tends to reduce signal losses (beamformer losses) and improve sensitivity for detecting small signals during receive modes, and tends to increase transmitted signal power levels during transmission modes. However, these TR modules contain active-electronic devices which may cause the antenna RF (Radio Frequency) circuits to have significantly higher failure rates as compared to RF circuits which have only passive electronic devices. And while these failures are not expected to significantly degrade certain antenna performance parameters, such as directivity, other performance parameters may be significantly degraded, such as antenna pattern sidelobe levels. Both military and commercial active-array antennas are at risk of not meeting expected requirements for low antenna pattern sidelobe levels due to electronic element failures.

U.S. Pat. No. 4,359,740, issued Nov. 16, 1982 in the name of Frazita, recognizes the possibility of failure of a phase shifting device of an array antenna. The failure is detected, and the signal energy to the failed phase shifting device is cut off, at least at certain beam angles. An FFT-based aperture monitor is described in U.S. Pat. No. 4,926,186, issued May 15, 1990 in the name of Kelly et al., which reveals faulty elements or phase shifting devices. U.S. Pat. No. 5,512,900, issued Apr. 30, 1996 in the name of Parkin et al., describes an instrument landing system in which antenna sidelobe levels are monitored, and which shuts down the system when the sidelobe level is deemed to be unacceptably degraded. U.S. Pat. No. 6,140,976, issued Oct. 31, 2000 in the name of Locke et al. describes an array antenna which has more elements than required in order to meet normal requirements, and which replaces a failed element to maintain desired performance levels. U.S. Pat. No. 4,623,381, issued Oct. 9, 1990 in the name of Helbig, describes failed-element processing in the context of systolic processing. Other schemes involve increasing the size of the antenna array over that which would otherwise be necessary in order to reduce the relative significance of individual transducing element failures, and reconstructing signals from failed transducing elements by applying known signal angle-of-arrival information and interpolation to signals from nearby non-failed transducing elements.

Improved antenna arrays and processing therefor are desired.

SUMMARY OF THE INVENTION

A method for generating an antenna beam, the method comprising the step of providing an array antenna in which the antenna transducing elements are spaced at less than one-half wavelength, whereby the element-to-element phase shift defines visible and invisible regions for the antenna spatial pattern. The method also includes the application of uncompensated weighting functions to the antenna element signals of the array antenna when no antenna elements have failed, so as to provide a controlled sidelobe level distribution within the visible region. In the presence of failures of one or more antenna elements, which tend to degrade the antenna pattern sidelobe levels, a compensated weighting function is applied to the antenna element signals of the array antenna so as to place the principal portion of the degradation of the sidelobe levels into the invisible region, whereby the sidelobe levels within the visible region tend to be maintained at the controlled levels which are obtained without failures of antenna elements.

In a particular mode of the method, the step of applying a compensated weighting function to the antenna element signals of the array antenna so as to place the principal portion of the degradation of the sidelobe levels into the invisible region comprises the step of applying a compensated weighting function to the antenna element signals of the array antenna so as to place the principal portion of the degradation of the sidelobe levels into a first portion of the invisible region remote from the visible region. The first portion of the invisible region is spaced apart from the visible region by a second portion of the invisible region having a selected range of element-to-element phase shifts, and this mode further comprises the step of adjusting the element-to-element phase shifts so as to scan the antenna beam and to move at least a part of the said second portion of the invisible region into the visible region.

BRIEF DESCRIPTION OF THE DRAWINGS

FIG. 4B is similar to FIG. 4A but which illustrates elevated sidelobe levels due to antenna element failures;

FIG. 6A, FIG. 6B and FIG. 6C illustrate mathematical vectors and a matrix;

FIG. 8B is a corresponding pattern plotted versus the sine of the antenna pattern angle;

DESCRIPTION OF THE INVENTION

Figure 1:
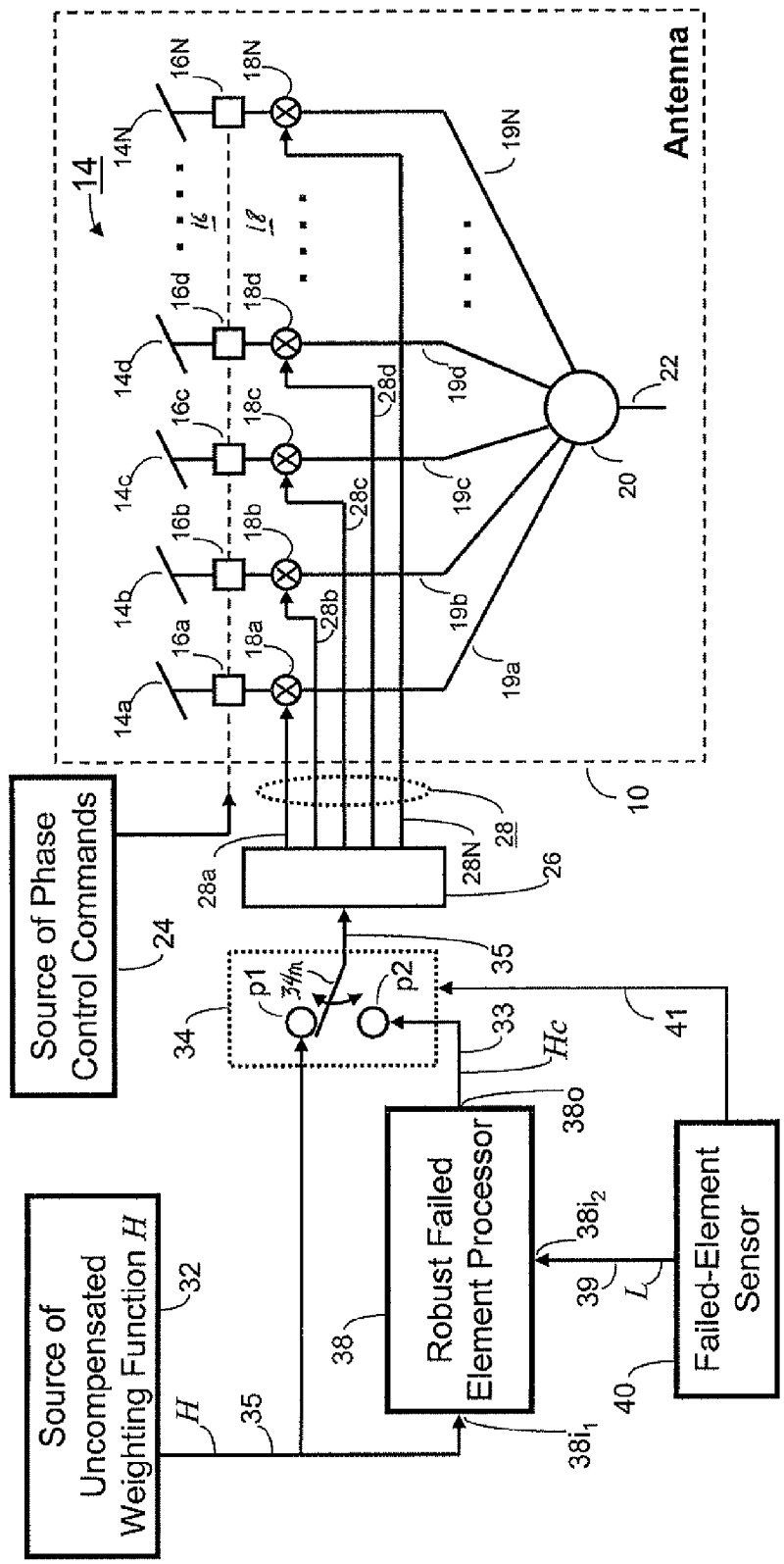
FIG. 1 is a simplified block diagram of an antenna consisting of an array of transmitting or receiving transducing elements and a system for providing weighting coefficients for the signals of the individual transducing elements.

The Failed-Element Processor array antenna arrangement according to an aspect of the invention tends to reduce and minimize degradations of sidelobe levels of antenna spatial patterns and can be applied to linear array antennas, to planar array antennas and to other array antennas such as conformal array antennas. It can be applied both for antenna signal reception and signal transmission modes of operation. FIG. 1 shows a simplified diagram of a linear array antenna 10. The illustrated array antenna may be viewed for purposes of explanation as being in signal reception mode. Array antenna 10 includes an array 14 of transducing elements 14a, 14b, 14c, 14d, . . . , 14N for receiving electromagnetic signals from free space. Signals received by each transducing element of array 14 are sent to each signal conditioning block of a set 16 of signal conditioning blocks. More particularly, received signal from transducing element 14a is sent to signal conditioning block 16a, received signal from transducing element 14b is sent to signal conditioning block 16b, received signal from transducing element 14c is sent to signal conditioning block 16c, received signal from transducing element 14d is sent to signal conditioning block 16d, . . . , and received signal from transducing element 14N is sent to signal conditioning block 16N. The signal conditioning blocks 16a, 16b, 16c, 16d, . . . , 16N of set 16 of conditioning blocks are provided with commands related to beam steering from a source 24 of phase control commands, and provide calibration and shifting of the phases of the signals in order to steer the antenna beam. Such calibration and shifting of the phases of the signals in order to steer the antenna beam are well known in the art. From the signal conditioning blocks of set 16, the conditioned signals are sent to a set 18 of weighting blocks and then sent to a signal combining network. More particularly, the conditioned signal from block 16a is sent to weighting block 18a for weighting (adjustment of its amplitude by a weighting coefficient), the conditioned signal from block 16b is sent to weighting block 18b for weighting, the conditioned signal from block 16c is sent to weighting block 18c for weighting, the conditioned signal from block 16d is sent to weighting block 18d for weighting, . . . , and the conditioned signal from block 16N is sent to weighting block 18N for weighting. Weighting coefficients are sent to the individual weighting blocks of set 18 from a distribution block 26 by way of a set 28 of paths. According to an aspect of the invention, weighting of the individual antenna transducing element signals is provided in order to control antenna spatial transmission and/or reception sidelobe levels. In general, signals from each transducing element of set 14 of antenna transducing elements are conditioned for calibration and beam steering and weighted for sidelobe level control, and are sent to a combiner illustrated as 20. Combiner 20 combines the calibrated, phase-shifted and weighted signals from each of the antenna transducing elements onto a path 22 in order to produce the desired antenna beam pattern.

In signal transmission mode, block 20 (which served as a combiner in reception mode) of the arrangement of block 10 of FIG. 1 splits signals which are sent to it by way of path 22, and sends signals to weighting block set 18 for weighting in order to control the antenna spatial pattern sidelobe levels. The weighted signals are then sent to the set 16 of signal conditioning blocks for calibration and phase shifting in order to control the shape and direction of the transmitted beam(s). The sidelobe level controlled, calibrated and phase shifted signals are then sent to the individual antenna transducing elements of set 14 for transmission into free space. Thus, in a transmission mode, the arrangement of FIG. 1 describes, in part, an antenna signal splitting and distribution network which sends signals to the antenna transducing element array for transmission into free space, and also describes a system for weighting of the individual transducing element signals which controls the sidelobe levels of the antenna spatial transmission pattern.

Figure 2A:
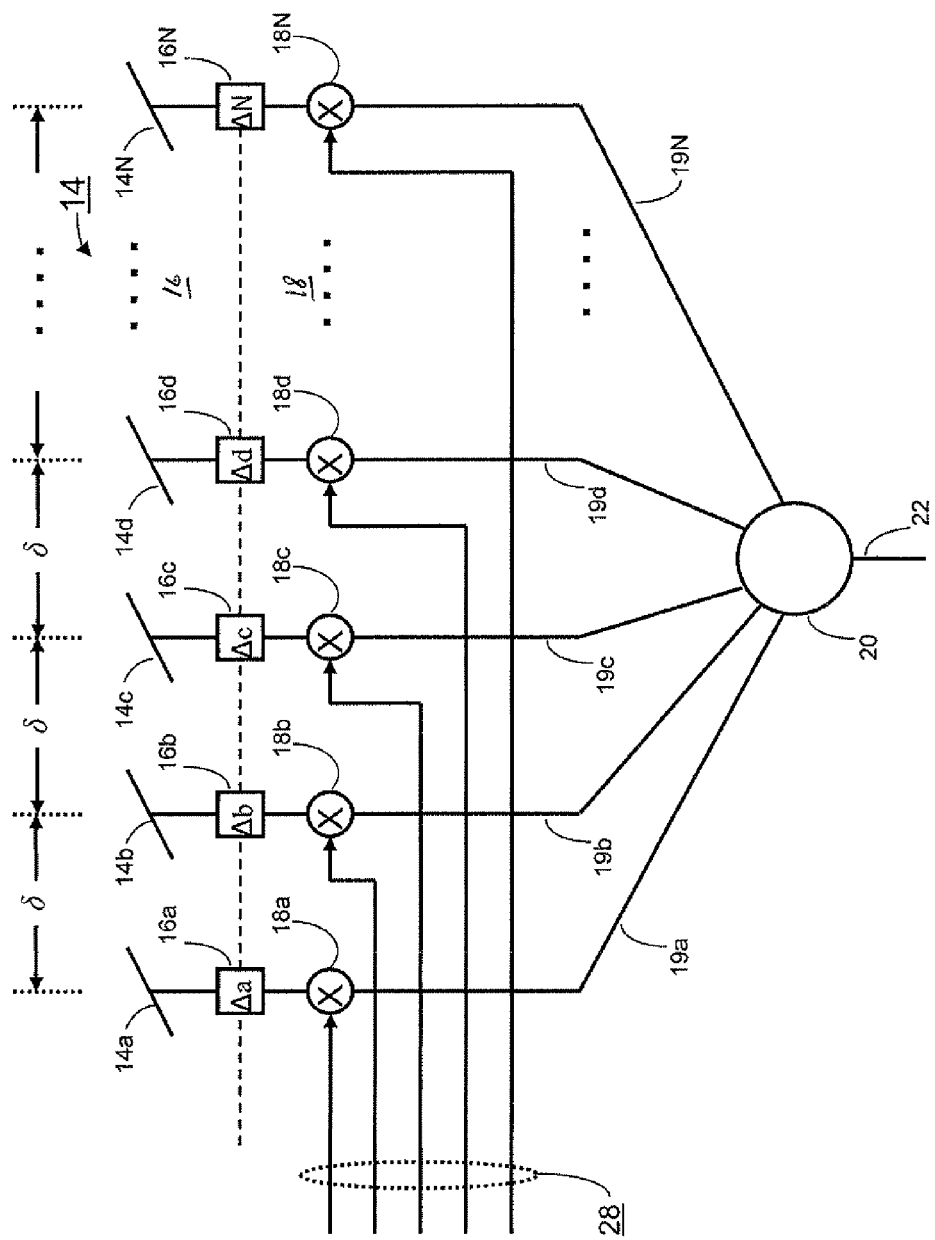
FIG. 2A is an antenna block diagram similar to that illustrated in FIG. 1 with added designations for the spacings between transducing elements and designations for the values of the phase shifting devices.

FIG. 2A illustrates a simplified array antenna, generally similar to that of block 10 of FIG. 1. In FIG. 2A, the physical spacings between adjacent transducing elements are designated as δ, and are uniform across the array. The set 16 of signal conditioning blocks are explicitly shown as being a set of electromagnetic phase shifting (changing) devices. The phase shift for conditioning block 16a is designated as Δa, the phase shift for conditioning block 16b is designated as Δb, the phase shift for conditioning block 16c is designated as Δc, the phase shift for conditioning block 16d is designated as Δd, . . ., and the phase shift for conditioning block 16N is designated as ΔN. It is well known that the relationship between the antenna beam pointing scan angle and the consecutive or element-to-element phase shift (delay or advance) provided by set 16 of conditioning blocks is given by equation (1).

$$\phi = 2\pi \frac{\delta}{\lambda} \text{Sin}(\theta) \qquad (1)$$

where:

$\phi$ is the phase shift between consecutive transducing elements (radians);

$\pi$ is 3.1415 . . . ;

$\delta$ is the spacing between elements (same units as $\lambda$);

$\lambda$ is the transmitted or received RF signal wavelength (same units as $\delta$);

Sin is the trigonometric Sine function; and $\theta$ is the beam pointing scan angle with respect to a line normal to the array.

Because the element-to-element phase shift is $\phi$, the phase shift of each element differs by $\phi$ radians relative to the phase shift of adjacent elements. Thus, in order to scan (point) the antenna beam to an angle $\theta$ with respect to a line normal to the array, the element-to-element phase shift $\phi$ is calculated using equation (1) and the phase shift Δa is $\phi$, the phase shift Δb is 2$\phi$, the phase shift Δc is 3$\phi$, the phase shift Δd is 4$\phi$, . . . , and the phase shift ΔN is N$\phi$. (As a practical matter, any fixed value of phase shift may be added to, or subtracted from, all phase shifting values in set Δa, Δb, Δc, Δd, . . . , ΔN, or integer multiples of 2$\pi$ radians may be added to, or subtracted from, individual values.) As an illustrative example, for an array antenna which has a uniform spacing between consecutive transducing elements $\delta$ which is one-half of the free-space wavelength $\lambda$, $\delta/\lambda$ equals ½ and $\phi$ is given by equation (2).

$$\phi = \pi \text{Sin}(\theta) \qquad (2)$$

Figure 2B:
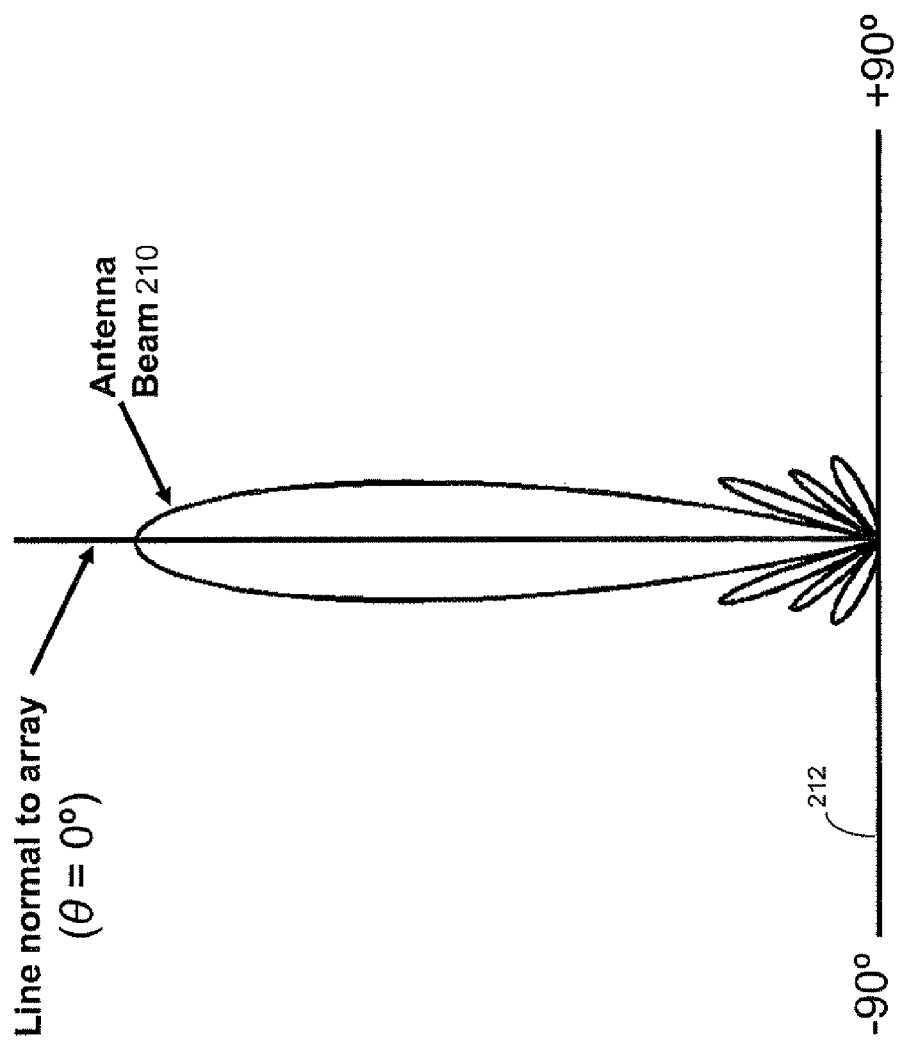
FIG. 2B illustrates an antenna beam pattern which is pointed to a direction normal or orthogonal to the line of the array.
Figure 2C:
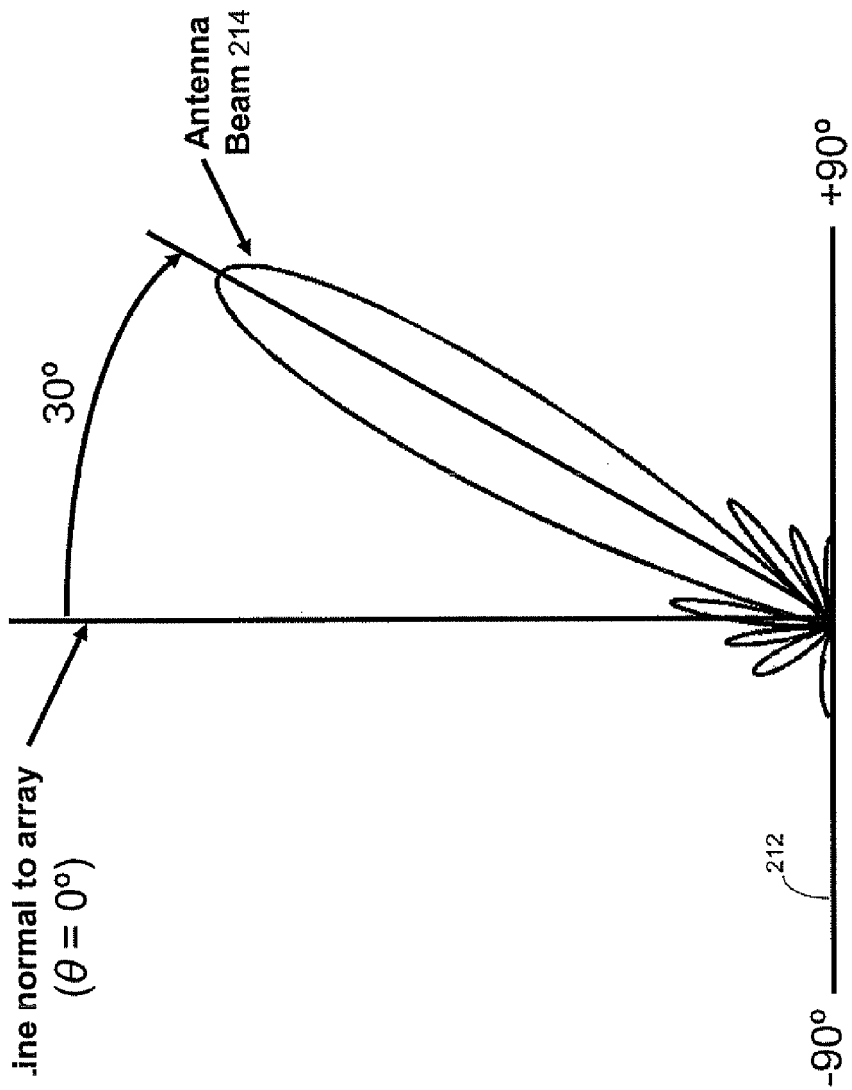
FIG. 2C illustrates an antenna beam pattern similar to that of FIG. 2B, but which is pointed to an angle of 30° relative to a line which is normal or orthogonal to the line of the array.

If the antenna beam is to be pointed in the direction of a line normal to the array, then $\theta = 0°$ and according to equation (2), $\theta = 0$ radians. Thus Δa is 0 radians, and Δb is 0 radians, and Δc is 0 radians, and Δd is 0 radians, . . . , and ΔN is 0 radians. FIG. 2B is an illustrative example of an antenna beam 210 which is pointed in the direction of a line normal ($\theta = 0°$) to the direction 212 of the array. And as a second example, if the antenna beam is to be pointed at another angle, say 30° relative to a line normal to the array, then $\theta = 30°$ and according to equation (2), $\phi = \pi/2$ radians. Thus Δa is $\pi/2$ radians, and Δb is 2$\pi/2$ radians, and Δc is 3$\pi/2$ radians, and Δd is 4$\pi/2$ radians, . . . , and ΔN* is N$\pi/2$ radians. FIG. 2C is an illustrative example of an antenna beam 214 which is scanned (pointed) at an angle of 30° with respect to a line ($\theta = 0°$) which is normal to the array. Element-to-element phase shift values for other antenna beam scan angles (not illustrated) may be calculated in an analogous manner to the above discussion.

For linear antenna arrays, the entire beam pointing angular space of the antenna is described by values of $\theta$ which vary from −90 to +90 degrees. From equation (1), the corresponding range of values for the phase shift between consecutive elements, $\phi$, is from −2$\pi\delta/\lambda$ to +2$\pi\delta/\lambda$ radians. Values for $\phi$ which lie within this range are sometimes described as being in the "visible region", which means that the corresponding beam pointing angles $\theta$ are realizable or possible. For an antenna element spacing $\delta$ which is less than one-half of the wavelength, $\lambda$, the visible region for $\phi$ is less than the entire phase shift range from −$\pi$ to +$\pi$ radians. Values for $\phi$ which lie outside of the visible region but which lie within −$\pi$ to +$\pi$ radians are sometimes described as being in the "invisible region". According to an aspect of the invention, it is recognized that, while the visible region contains antenna beam space degrees-of-freedom which are necessary for obtaining realizable or possible antenna beam shape and low sidelobe levels, the invisible region contains redundant antenna beam space degrees-of-freedom. The redundant beam space degrees-of-freedom are beyond those which are necessary for obtaining beam shape and low sidelobe levels in realizable space. According town aspect of the invention, these redundant beam space degrees-of-freedom are utilized in order to compensate for failed transducing elements and to provide antenna low sidelobe levels in realizable space which are virtually identical to those which are obtained in the absence of, or without, antenna transducing element failures.

Figure 3A:
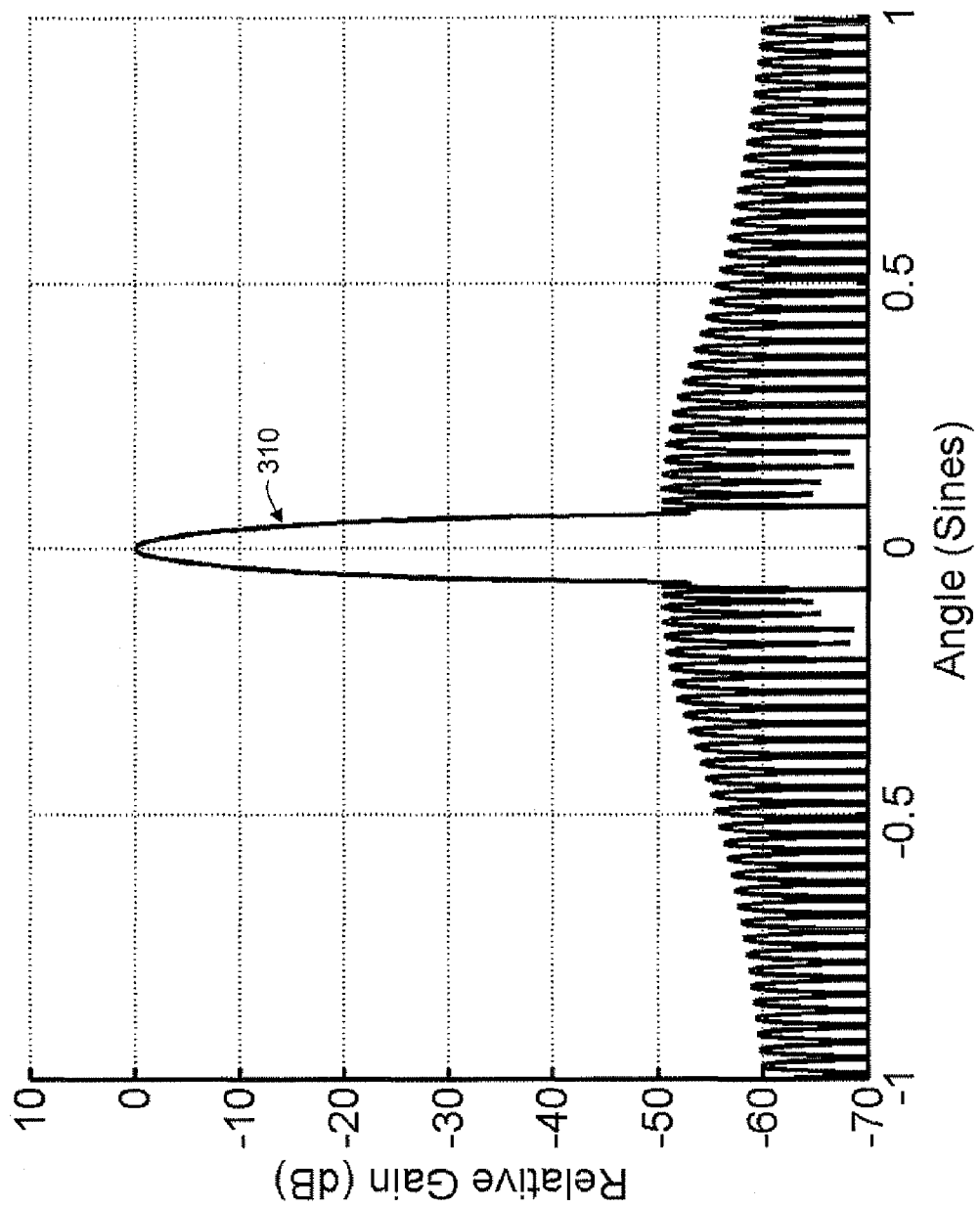
FIG. 3A illustrates an antenna pattern plotted in units of deciBels versus the sine of the antenna pattern angle, showing a main beam and sidelobe regions without antenna transducing element failures.

In conventional prior art array antenna beamforming, signals which are received by, or are sent to, individual array antenna transducing elements are amplitude weighted with a suitable uncompensated weighting function, such as: uniform, raised-cosine, Taylor or Dolph-Tschebyscheff, in order to produce acceptable sidelobe levels for the antenna spatial pattern. The uncompensated weighting function may be uniform if maximum antenna gain is desired, and may be some other function if low sidelobe levels are desired. Examples of prior art weighting functions which produce low sidelobe levels in the absence of transducing element failures include: raised-cosine weighting, Dolph-Tschebyscheff weighting, and Taylor weighting functions. Prior art weighting functions are designed for array antennas in which all antenna transducing elements are operational. The numbers of transducing elements, the element spacings, amplitude weightings, and other parameters are selected in order to ensure that the antenna possesses desired antenna beam pattern characteristics, such as directivity gain and low sidelobe levels. Failure of one or more antenna transducing elements of an array tends to change the sidelobe levels. For illustrative purposes, FIG. 3A is an antenna pattern 310 which is plotted versus the sine of the angle of the pattern. The illustrated pattern is for a 100-element linear array with −50 dB sidelobe Taylor weighting, which causes a 1.54 dB aperture efficiency loss. The exemplary RF frequency is 3.3 GHz, and the element-to-element spacing of the array of transducing elements is ⅓ of the RF wavelength. The pattern is plotted in units of dB (deciBels) relative to the peak pattern gain, which is 18.46 dB. The antenna pattern of FIG. 3A is with no transducing element failures.

Figure 3B:
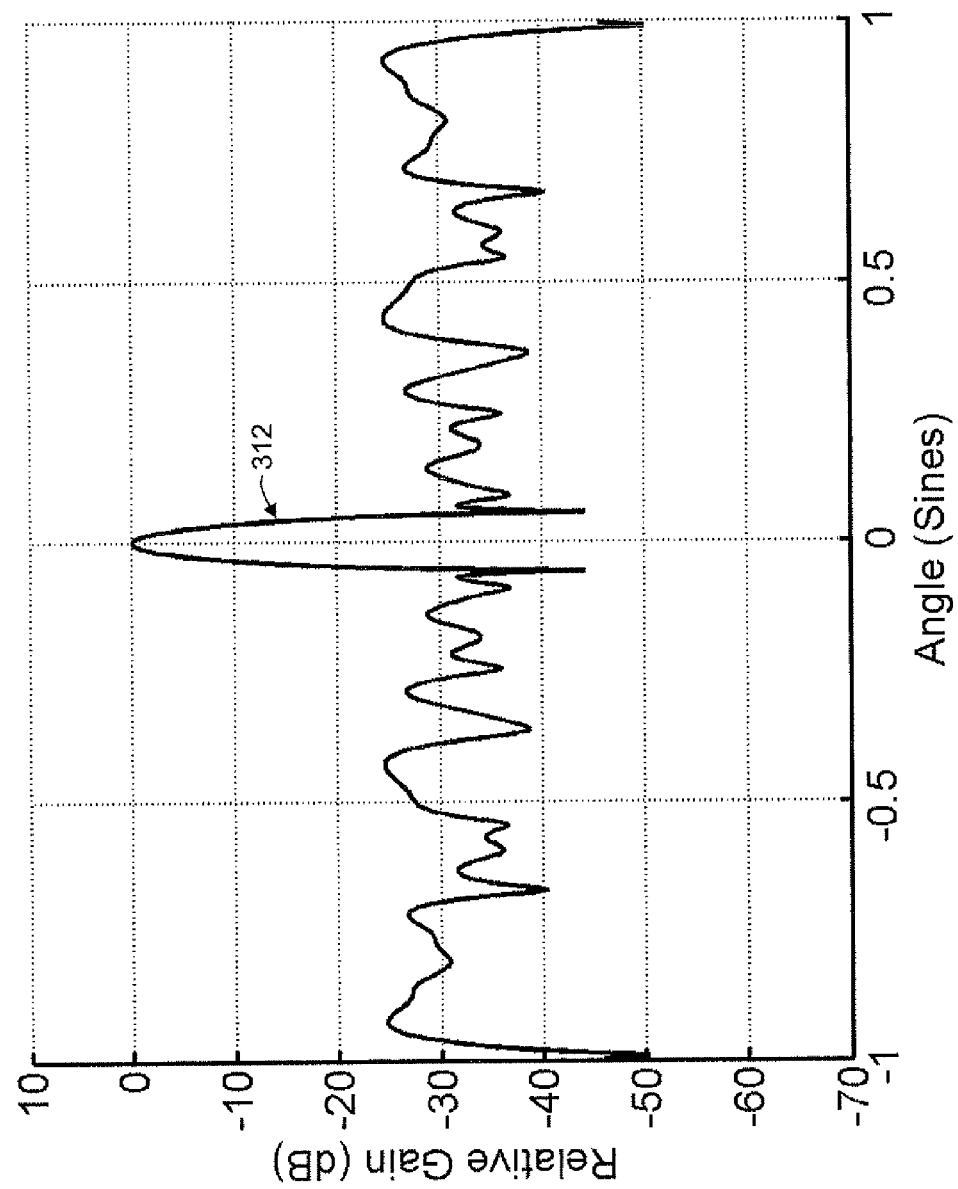
FIG. 3B is a corresponding plot illustrating elevated sidelobe levels due to antenna transducing element failures.

It is possible for one or more of the transducing elements 14 of the array antenna in block 10 of FIG. 1 to fail. Failure of one or more antenna transducing elements of an array tends to change the sidelobe levels. As an example, FIG. 3B illustrates the degraded antenna pattern 312 which is caused by failures of elements numbered 21, 43, 50 and 63, of the exemplary 100-element array, which corresponds to 4% of the transducing elements having failed. These failures cause a loss of 0.22 dB in peak antenna directivity and a 25 dB degradation of the peak sidelobe level (from −50 dB as shown in FIG. 3A to −25 dB as shown in FIG. 3B). This amount of sidelobe level degradation may be unacceptable for many antenna applications.

Figure 4A:
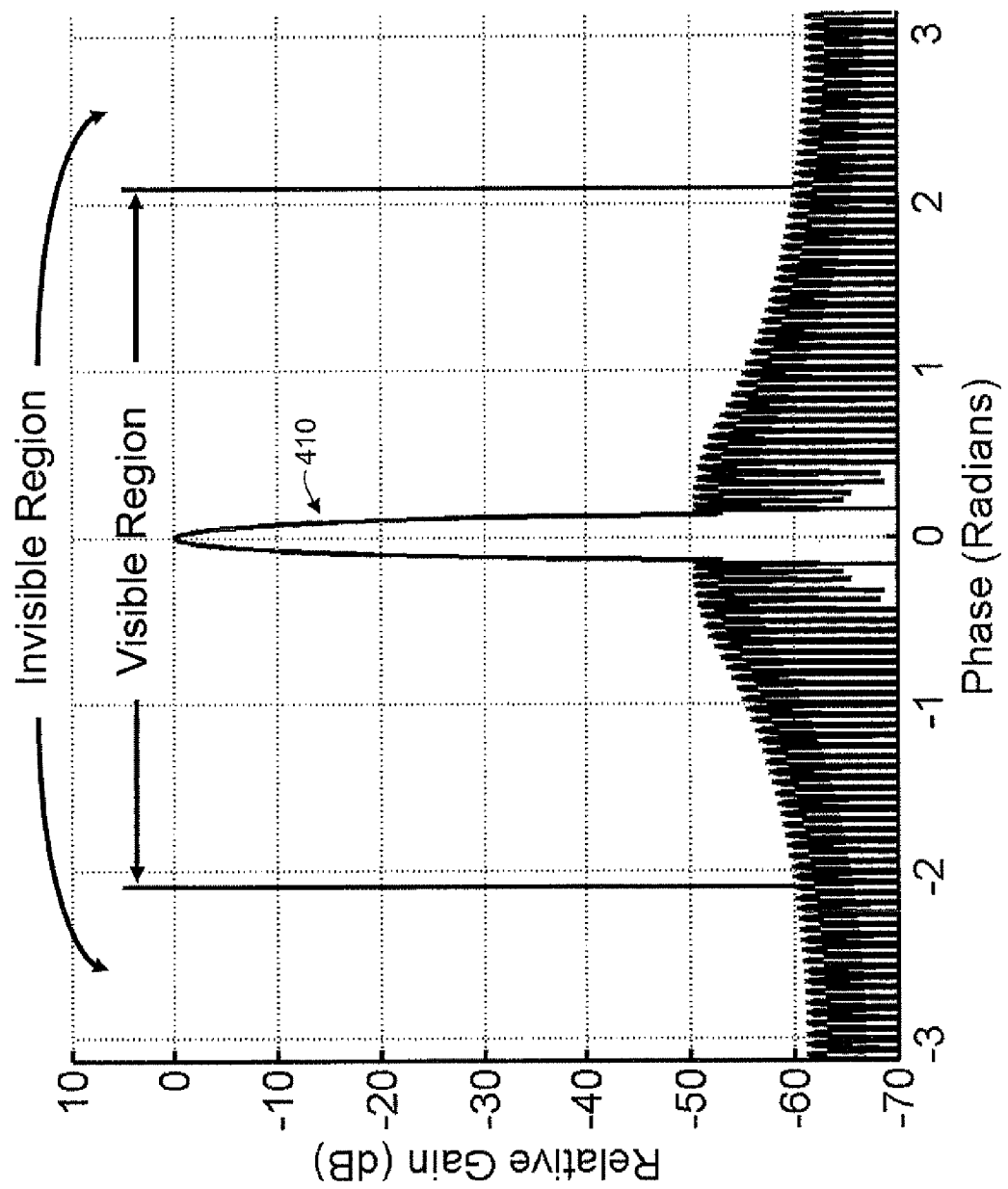
FIG. 4A is an illustration of an antenna pattern plotted versus the element-to-element phase shift (radians) for an array antenna without element failures, showing the presence of visible and invisible regions.

An aspect of the invention applies to antenna arrays in which the element-to-element spacings are less than one-half of the wavelength of the electromagnetic signal (less than λ/2). For antenna arrays which are not line arrays, different element spacings may exist in each dimension, such as for planar arrays and for conformal arrays. FIG. 4A illustrates a plot 410 of the exemplary antenna pattern of FIG. 3A (with no transducing element failures) plotted versus the value of the element-to-element phase shift, ϕ, from −π to +π radians. Because the transducing element spacings for this example are ⅓ of the RF wavelength, only the region of FIG. 4A which lies between values of phase shift ϕ ranging from −2π/3 to +2π/3 radians corresponds to physically realizable signal angles of arrival, or angles of transmission. This region is labeled as the "visible region" in FIG. 4A. It should be noted that the visible region of the plot of FIG. 41 corresponds to the entire plot shown in FIG. 3A. The portions of the antenna pattern which are outside of the visible region in FIG. 4A are described by the term, "invisible region". These invisible regions exist in FIG. 4A because the antenna transducing element spacing for the 100-element array example is one-third of the wavelength. These invisible regions correspond to redundancy of antenna beam space degrees-of-freedom and redundancy of transducing elements. For other array antennas which have transducing element spacings which are greater than or are equal to one-half of the RF wavelengths, no invisible regions exist and all antenna beam space degrees-of-freedom are used to form the antenna main beam and sidelobe regions of the antenna pattern in realizable space. For decreasing transducing element spacings relative to one-half of the RF wavelength, the widths of the invisible regions increase and provide antenna beam space degrees-of-freedom in excess of those which are needed for the antenna pattern main beam and sidelobe regions in realizable space. According to an aspect of the invention, these excess or redundant degrees-of-freedom are utilized for compensating for failed antenna transducing elements and thereby maintaining antenna sidelobes in the visible region at levels similar to those which exist in the absence of failures.

Figure 5:
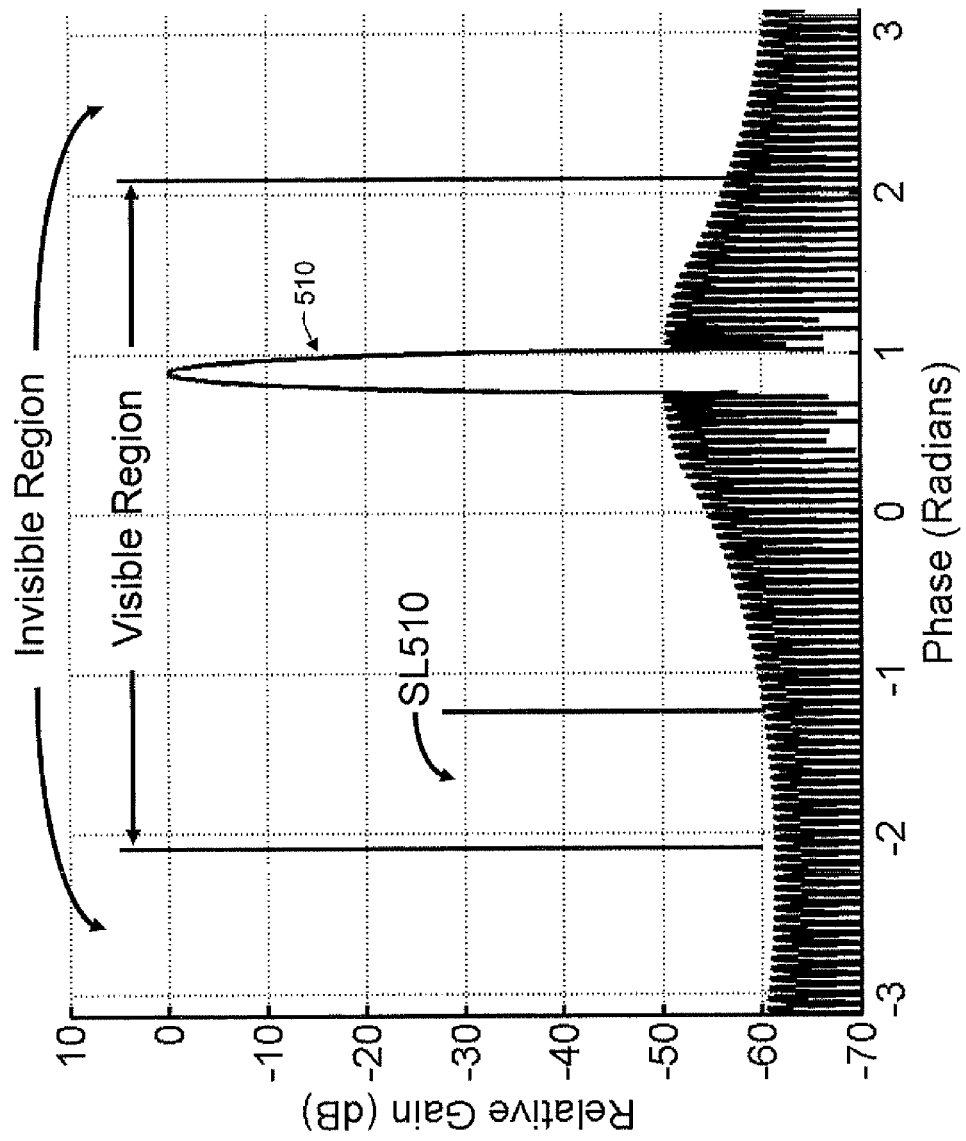
FIG. 5 illustrates an antenna pattern plotted versus the element-to-element phase shift, for an antenna array without failed elements, showing the effect of changing the element-to-element phase shift or scanning of the antenna beam.

The plot 410 of FIG. 41 shows the exemplary antenna pattern for the beam scanned to a direction corresponding to a line which is normal to the antenna array, θ=0° and FIG. 4A identifies the corresponding visible region of the antenna pattern. The visible region of the pattern corresponds to the portion of the pattern which is realizable or exists over the angular region from −90° to +90° with respect to a line normal to the antenna array. For other antenna beam scan angles, other regions of the beam pattern occupy the visible region. The plot 510 of FIG. 5 shows the exemplary antenna pattern for the beam scanned to an angle of 25° with respect to a line normal to the antenna array. Comparing FIG. 5 to FIG. 4A it is seen that FIG. 5 corresponds to FIG. 4A, but shifted to the right by about 0.89 radians of element-to-element phase shift ϕ. The phase shift ϕ of 0.89 radians is calculated using equation (3), which is itself obtained from equation (1) by substitution of 25° for θ and ⅓ for δ/λ.

$$0.89 \cong \frac{2\pi}{3} \sin(25°) \quad (3)$$

The sidelobe region designated as SL510 in FIG. 5 identifies a region of the antenna pattern which exists in visible or realizable space for a beam scan angle of 25°, whereas this designated sidelobe region exists only in invisible space or does not exist in realizable space for a beam which is pointed in the direction of a line normal to the antenna array as shown in FIG. 4A. Thus, the sidelobe levels within the invisible region can be of interest in the case of antenna patterns or beams which are scanned through space.

FIG. 4B shows the exemplary antenna pattern of FIG. 3B with failures of transducing elements numbered 21, 43, 50 and 63, of the exemplary 100-element array, plotted versus the value of the element-to-element phase shift, analogous to the previous discussion about the relationship between FIG. 4A and FIG. 3A. As in the discussion of FIG. 4A, the indicated visible region in FIG. 4B corresponds to the entire plot shown in FIG. 3B. As illustrated in FIG. 4B, the degradations of the sidelobe levels which are attributable to failures of antenna transducing elements raises the sidelobe levels in the invisible regions to the left and to the right of the visible region as well as within the visible region.

According to an aspect of the invention, the Robust Failed-Element Processor compensates, insofar as possible, for antenna transducing element failures by calculating a compensated weighting function which is applied to the signals which are received by, or sent to, the antenna transducing elements, in place of the uncompensated prior art weighting function. According to an aspect of the invention, the compensated weighting function provides, in a specified angular interval of the antenna spatial pattern, sidelobe levels which tend to be nearly equal to the sidelobe levels obtainable in the same angular interval with the uncompensated prior art weighting function and in the absence of transducing element failures. The angular interval in which sidelobe levels tend to be nearly equal can be specified and can span an angular interval where maintaining low sidelobe levels is an important factor for the proper functioning of the antenna. And for antennas which have spacings between consecutive transducing elements which are less than one-half of the RF wavelengths, the angular interval in which low sidelobe levels are maintained may be the entire visible region of the antenna pattern.

The uncompensated weighting function which is used in the absence of transducing element failures is designated as H, and it is generated in a block 32 of FIG. 1 in any prior-art manner. This uncompensated weighting function sets the sidelobe levels (amplitudes) for the antenna pattern in the absence of failed transducing elements. The uncompensated weighting function H is sent from block 32 by way of path 35 to port or terminal p1 of selector 34, which is illustrated for ease of explanation by a conventional single-pole, double-throw switch symbol. The uncompensated weighting function H is illustrated in FIG. 6A as a row vector which contains the weighting function coefficients (values) $h_1, h_2, h_3, \ldots, h_N$. The uncompensated weighting function H is also sent from source 32 of FIG. 1 to a Robust Failed-Element Processor designated 38. Robust Failed-Element Processor 38 is provided by way of path 35 with the uncompensated weighting function H from source 32 and is also provided by way of path 39 with a list of the failed antenna transducing elements (if any) from Failed-Element Sensor 40. Failed-Element Sensor 40 may be any prior-art arrangement, and may be located as shown external to the antenna 10, or it may be within antenna 10, or partially within and partially without. Robust Failed-Element Processor 38 processes the information to produce at its output port 38o a compensated weighting function designated Hc. Compensated weighting function Hc is sent by way of path 33 to a second port or terminal p2 of selector 34.

In the absence of sensing of failures of transducing elements of antenna array 10 of FIG. 1, Failed-Element Sensor 40 sends a control command by way of path 41 to selector 34, and selector 34 responds by selecting the uncompensated weighting function H on port p1, and sending the uncompensated weighting function by way of path 35 to distribution block 26 for distribution of the uncompensated weighting function coefficients, by way of paths of set 28 of paths, to the individual weighting blocks of set 18. It will be understood that the weighting function coefficients will, in general, have different values for each transducing element signal, and block 26 performs the distribution. With the uncompensated weighting function H applied to the antenna 10, the desired antenna beam pattern and sidelobe levels are produced in the absence of failures of antenna transducing elements.

When Failed Element Sensor block 40 of FIG. 1 senses a failed antenna element or elements, Failed Element Sensor block 40 produces a list L of failed transducing elements, identifying their locations within the array. List L is sent by way of path 39 to the Robust Failed-Element Processor 38, and processor 38 performs processing as described in conjunction with FIG. 7 in order to generate a compensated weighting function Hc at its output port 38O. The compensated weighting function Hc is sent on path 33 to port p2 of selector 34. At the same time, Failed Element Sensor block 40 sends a command by way of path 41 to selector 34, and selector 34 responds by selecting the compensated weighting function Hc on port p2 and sending the compensated weighting function by way of path 35 to distribution block 26. As in the case of when the uncompensated weighting function is sent to distribution block 26, distribution block 26 distributes the compensated weighting function to the individual weighting blocks of array antenna 10. Compensated weighting function Hc is illustrated in FIG. 6B as a row vector which contains the compensated weighting function coefficients (values) $hc_1, hc_2, hc_3, \ldots, hc_N$.

In the absence of antenna transducing element failures, selector 34 of FIG. 1 selects the uncompensated weighting function H on port p1, and then sends the uncompensated weighting function by way of path 35 to distribution block 26 for distribution by way of the set 28 of paths. If antenna transducing element failures are sensed, selector 34 selects the compensated weighting function Hc on port p2 and sends the compensated weighting function Hc, by way of path 35 to distribution block 26 for distribution by way of the set 28 of paths. Whichever weighting function is selected by selector 34, either H or Hc is provided on path 35 to block 26. Block 26 sends the individual coefficients which comprise the weighting function vectors for application to the individual antenna transducing element signals. For example, if uncompensated weighting function H is selected by selector 34, then the first coefficient $h_1$, shown in FIG. 6A, is sent by way of path 28a in FIG. 1 to weighting block 18a. The second coefficient $h_2$, also shown in FIG. 6A, is sent by way of path 28b in FIG. 1 to weighting block 18b. In a similar fashion, the third coefficient $h_3$ is sent by way of path 28c to weighting block 18c, the fourth coefficient is sent by way of path 28d to weighting block 18d, . . . , and all remaining coefficients in vector H, shown in FIG. 6A, are sent by way of their respective paths shown in FIG. 1 to their respective weighting blocks, which are also shown in FIG. 1. Alternatively, if compensated weighting function Hc is selected by selector 34, then the coefficients which comprise Hc, as shown in FIG. 6B, are sent in place of the uncompensated weighting function coefficients which comprise vector H as shown in FIG. 6A.

Information on which transducing elements have failed is provided by way of a path 39 to the Robust Failed-Element Processor block 38 of FIG. 1 as a list designated as L. For example, if the first transducing element 14a of the antenna array 10 of FIG. 1 has failed, then list L would contain a "1". If the second transducing element 14b of the antenna array in FIG. 1 has failed, then list L would contain a "2". If multiple transducing elements have simultaneously failed, list L would contain the identifying numbers of each of the failed elements. As an example of multiple failures with an antenna array of 100 elements, if antenna elements designated as 14a, 14c, and 14N in FIG. 1 have simultaneously failed, then list L would contain the numbers "1", "3", and "100".

Figure 7:
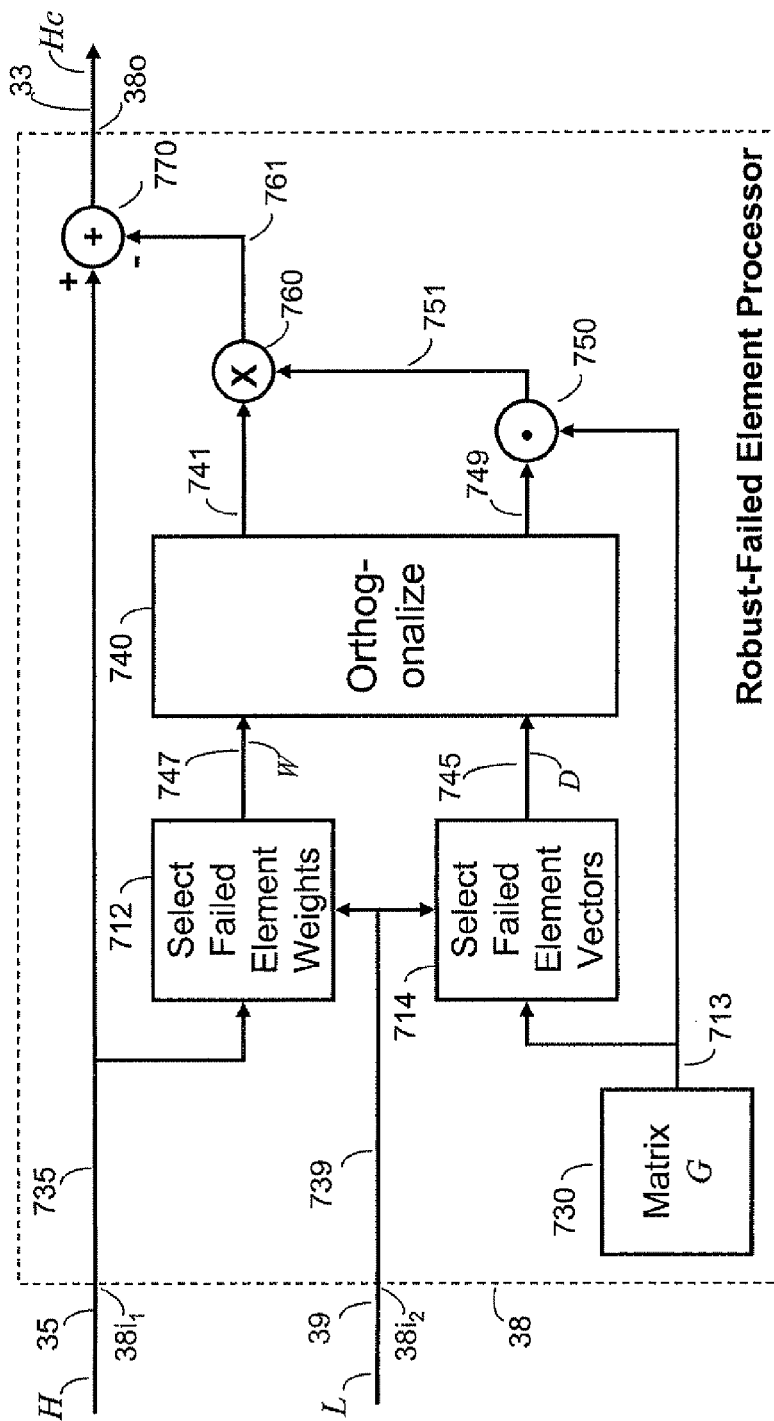
FIG. 7 is a simplified block diagram of the processing steps or blocks which implement the method of the Robust Failed-Element Processor, according to an aspect of the invention.

FIG. 7 illustrates details of Robust Failed-Element Processor 38 of FIG. 1. In FIG. 7, Robust Failed-Element Processor 38 receives the uncompensated weighting function H by way of path 35 and the list L of failed transducing elements by way of path 39, and calculates the compensated weighting function Hc. The compensated weighting function Hc is made available at output port 38o and is sent by way of path 33 to port p2 of selector 34 of FIG. 1. In Robust Failed-Element Processor 38 as illustrated in FIG. 7, the list L of failed transducing elements is sent to Select Failed Element Weights block 712 and to Select Failed Element Vectors block 714. Block 712 is also provided by way of path 735 with the uncompensated weighting function H, and block 714 is also provided by way of path 713 with a matrix G from block 730.

Matrix G is stored in block 730 of FIG. 7 and describes vectors which span the angular region(s) of the antenna pattern which correspond to redundant beam space degrees-of-freedom or at least angular regions of the antenna pattern where maintaining low sidelobe levels is not an important factor for the proper functioning of the antenna, and which are utilized in order to compensate for degraded sidelobe levels which are due to failures of antenna transducing elements according to an aspect of the invention. Matrix G is illustrated in FIG. 6C and has M rows and N columns. The number of columns N is the same as the number of antenna transducing elements as shown in block 10 of FIG. 1 and in FIG. 2A. The number of rows M corresponds to the number of vectors which are chosen to span the angular regions of the antenna pattern where maintaining low sidelobe levels is not an important factor for the proper functioning of the antenna or which correspond to redundant beam space degrees-of-freedom or the invisible regions as shown in FIG. 4A. The values in matrix G which are shown in FIG. 6C may be calculated by the following two-step procedure designated as Procedure A:

Step Number 1 of Procedure A includes specification of a set of phase values which span the invisible regions from $-\pi$ to $-2\pi\delta/\lambda$ radians and from $+2\pi\delta/\lambda$ to $+\pi$ radians of the antenna pattern, where consecutive phase values within the set are generally spaced no greater than $2\pi/N$ radians apart, and where N is the number of elements in the array. The set of phase values which span the invisible regions are designated as $\psi_k$, k=1, 2, 3, . . . , M.

Step Number 2 of Procedure A involves calculating the entries of matrix G illustrated in FIG. 6C. Each entry in matrix G is calculated by equation (4).

$$g_{kn} = h_n \exp(j\psi_k n) \qquad (4)$$

where:

$h_n$ is the uncompensated weighting function coefficient for column n as shown in FIG. 6A;

j is the mathematical square-root of negative one ($\sqrt{-1}$);

$\psi_k$ are the set of phase values which are produced in Step Number 1 of Procedure A;

k are the row numbers of matrix G, (k=1, 2, 3, . . . , M);

exp( ) is the mathematical exponential function; and n are the column numbers of matrix G, (n=1, 2, 3, . . . , N).

As a variation of implementation of the Robust Failed-Element Processor, matrix G which is stored in block 730 of FIG. 7 may describe vectors which span an angular interval of the antenna pattern which is within the visible region, but which is not of interest for maintaining low sidelobe levels in the presence of antenna transducing element failures. This variation of implementation may be desirable for some antenna applications which do not have transducing element-to-element spacings which are less than one-half wavelength, and/or have angular intervals of visible space where maintaining low sidelobe levels is not of interest. For this variation of implementation, the entries of matrix G which are shown in FIG. 6D may be calculated by the following procedure, designated as Procedure B.

Step Number 1 of Procedure B includes specification of a set of phase values which span the angular intervals of the visible region of the antenna pattern where maintaining low sidelobe levels in the presence of failed transducing elements is not of interest. Let such an angular interval be specified between two angles designated as $\theta_1$ and $\theta_2$. Equation (1) is used to calculate the phase values, designated as $\phi_1$ and $\phi_2$, which correspond to $\theta_1$ and $\theta_2$ as shown by equation (5) and equation (6), respectively.

$$\phi_1 = 2\pi \frac{\delta}{\lambda} \sin(\theta_1) \qquad (5)$$

$$\phi_2 = 2\pi \frac{\delta}{\lambda} \sin(\theta_2) \qquad (6)$$

A set of phase values is then specified which span the region from $\phi_1$ to $\phi_2$, where consecutive phase values within the set are generally spaced no greater than $2\pi/N$ radians, and where N is the number of transducing elements in the array. The set of phase values which span the region from $\phi_1$ to $\phi_2$ is designated as $\eta_k$, k=1, 2, 3, ..., M.

Step Number 2 of Procedure B is identical to Step Number 2 of Procedure A, except that the set of phase values which are used in equation (4) is $\eta_k$, in place of $\psi_k$.

As another variation of implementation, a set $\psi_k$, k=1, 2, 3, ... of phase values may be calculated according to Step Number 1 of Procedure A which span the invisible region and another set $\eta_k$, k=1, 2, 3, ... of phase values may be calculated according to Step Number 1 of Procedure B which span an angular interval from $\theta_1$ to $\theta_2$ of the visible region, and the two calculated sets of phase values may be combined into an augmented set of phase values. The augmented set of phase values is obtained by replacing the set of phase values $\psi_k$ by a set of phase values which is obtained by combining the values which exist within both sets $\psi_k$ and $\eta_k$. The phase values of the augmented set span both the invisible region and also span the angular interval within the visible region where maintaining low sidelobe levels is not of interest. Each entry in matrix G of FIG. 6C is then calculated as specified in Step Number 2 of Procedure A, using the augmented set of phase values. This variation of implementation may be desirable for antenna applications which have spacings between adjacent transducing elements which are less than one-half wavelength and which also have angular intervals within the visible region where maintaining low sidelobe levels is not of interest.

However generated, matrix G is stored in block 730 of FIG. 7, and is sent by way of a path 713 to the Select Failed Element Vectors block 714, and the uncompensated weighting function H is sent by way of path 735 to the Select Failed Element Weights block 712. The Select Failed Element Vectors block 714 and the Select Failed Element Weights block 712 are also provided by way of path 739 with the failed element information list L. The Select Failed Element Vectors block 714 selects columns from matrix G (FIG. 6C) which correspond to the numbers or identities of the failed elements as provided in list L. The selected columns from matrix G constitute column vectors which are then provided by way of a path 745 to the Orthogonalize block 740. The Select Failed Element Weights block 712 selects weight coefficients from the uncompensated weighting function H (FIG. 6A) which correspond to the numbers or identities of the failed elements as provided in list L. The selected weight coefficients from H are then sent by way of path 747 to the Orthogonalize block 740.

The Select Failed Element Weights block 712 of FIG. 7 selects the coefficients from the uncompensated beam former weighting vector, H, which correspond to the failed transducing elements in the list L and concatenates them into row vector, W. In an analogous manner, the Select Failed Element Vectors block 714 selects the vector columns from G which correspond to the failed transducing elements in the list L and concatenates them into matrix, D. The W vector and D matrix which are produced by Select Failed Element Weights block 712 and by Select Failed Element Vectors block 714, respectively, are then processed by the "Orthogonalize" block 740.

The Orthogonalize block 740 scales vectors and removes overlapping components in order to prevent interactions in their subsequent use. For P failed elements, D will be a matrix with P columns and W will be a row vector with P coefficients. The overlapping portions of the vectors are removed by processing pairs of vectors. Orthogonalization with respect to the first vector is accomplished by removing, from all of the remaining vectors, portions which overlap with the first vector. Orthogonalization with respect to the second vector is accomplished by removing, from all of the remaining vectors, excluding the first vector, portions which overlap with the second vector. Orthogonalization with respect to the third vector is accomplished by removing, from all of the remaining vectors, excluding the first and second vectors, portions which overlap with the third vector. In a similar manner, the above-described overlap removal process is continued until overlapping portions are removed from all of the vectors. For any two vectors in the above process, the overlapping portion of the first vector is removed from the second vector by a two step procedure. The first step consists of calculating the overlap projection of the first vector onto the second vector. The overlap projection is the ratio of two numbers. The numerator of the ratio is calculated as the vector inner product of the first vector and the second vector. The denominator is calculated as the vector inner product of the first vector with itself. The second step consists of multiplying the projection value which was calculated in step number 1, with (or by) the first vector, and subtracting the result from the second vector in order to produce orthogonalized vectors. For the column vectors in D=[$d_1$ ⋮ $d_2$ ⋮ $d_3$ ⋮ ... ], for each vector pair, $d_i$ and $d_j$, the overlapping portion of $d_i$ is removed from $d_j$ by first calculating the projection, $p_{ij}=d'_i d_j c_i$, where $d'_i$ is the complex-conjugate-transpose of the vector $d_i$ and $c_i=1/d'_i d_i$. The vector $d_j$ is then replaced in matrix D by its value with the overlapping portion subtracted off, $d_j - p_{ij} d_i$. This process is repeated for each vector pair in D, and replaces D with an equivalent orthogonal vector set. The orthogonalized vectors are then sent by way of path 749 to the Inner Product Multiplier (•) block 750.

The weight coefficients which are sent by way of path 747 to the Orthogonalize block 740 are processed in a similar manner to that explained above for the vectors. That is, for each vector passed from block 714 to block 740, a corresponding weight coefficient is passed from block 712 to block 740. For each vector pair from block 714 which is processed for overlap removal in block 740, the corresponding weight coefficient pair from block 712 is processed in an analogous manner, except for the overlap projection and an additional normalization step. In processing each weight pair from block 712, the projection value which is used is the value which is calculated for the corresponding vector pair from block 714. That is, for W=[$w_1\, w_2\, w_3\, \ldots$], for each pair of coefficients, $w_i$ and $w_j$, $w_j$ is replaced by $w_j - p_{ij} w_i$, where $p_{ij}$ is described above. After the weight pairs are processed using the projection values from the corresponding vector pairs, the resulting weight values are normalized or divided by the denominator terms which were previously calculated for the corresponding vectors as explained above. The processed weight coefficients are then sent from block 740 by way of path 741 to Multiplier (X) block 760.

Each vector which is provided by way of path 749 to the Inner Product Multiplier block 750 is used in turn to calculate a new vector which is sent by way of path 751 to Multiplier block 760. Each new vector is constituted as the set of values which are obtained by calculating the inner products of each vector which is provided by way of path 749, with the set of vectors which are obtained from each of the columns of matrix G. Matrix G is provided by way of path 713 to the Inner Product Multiplier block 750. For each vector which is provided by way of path 749, one new vector is calculated by Inner Product Multiplier block 750, and is sent by way of path 751 to Multiplier block 760. For each vector which is sent by way of path 751 to the Multiplier block 760, a corresponding processed weight coefficient is sent by way of path 741 to the Multiplier block 760. Multiplier block 760 scales or multiplies each vector which is sent by way of path 751, with (or by) the corresponding processed weight coefficient which is sent by way of path 741. Each resulting scaled vector is then sent by way of path 761 to the inverting (−) input port of the Application or summing block 770. Application block 770 applies each scaled vector which is sent by way of path 761 to its inverting input port, to the uncompensated weighting function H which is sent by way of path 735 to its noninverting (+) input port. By applying or subtracting each scaled vector, Application block 770 tends to adjust H or compensate for degradations of the antenna pattern sidelobe levels which are caused by the failed antenna transducing elements. Application block 770 sends the compensated weighting function Hc to output port 38o of Robust Failed-Element Processor 38 and by way of path 33 to selector block 34, as shown in FIG. 1.

Figure 8A:
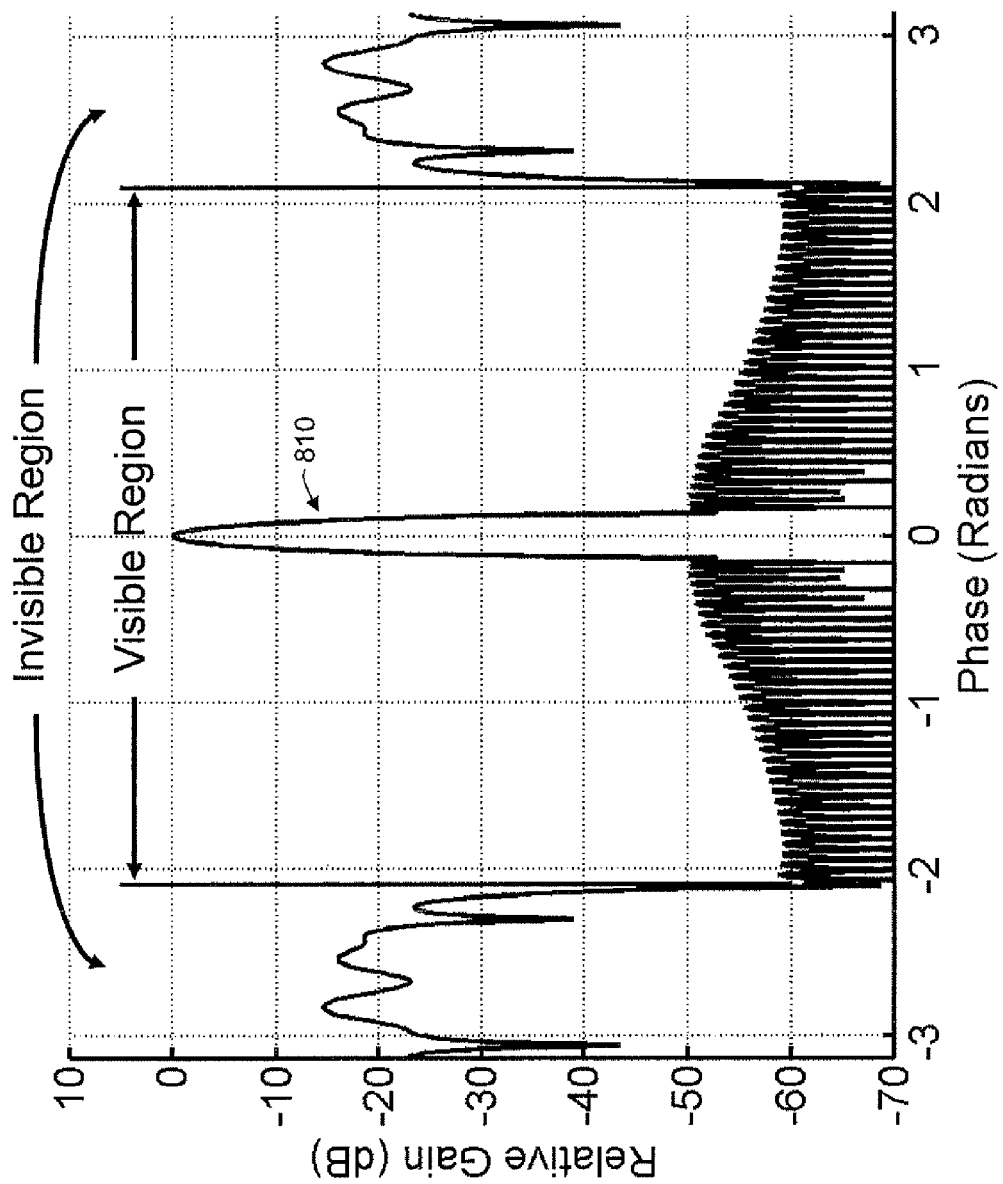
FIG. 8A is an illustration of an antenna pattern with antenna element failures, plotted versus the element-to-element phase shift, showing that low sidelobe levels are maintained in the visible region with Robust Failed-Element Compensation.

FIG. 8A is a plot 810 of an antenna pattern versus the element-to-element phase shift 0, with Robust Failed-Element Compensation according to an aspect of the invention. The plot of FIG. 8A is for the above exemplary linear array example of 100 elements, with −50 dB sidelobe Taylor weighting, with failed element numbers 21, 43, 50 and 63, of the 100-element transducing element array. Comparing FIG. 8A with FIG. 4B shows that the Robust Failed-Element Processor improves pattern sidelobe levels within the visible region in the presence of failed elements. As discussed previously, the visible region is the only portion of the pattern which corresponds to physically realizable signal angles of arrival. FIG. 8A also shows that the Robust Failed-Element Processor, which utilizes the redundant beam space degrees-of-freedom within the invisible region, degrades sidelobe levels which are within the invisible region. This is, of course, of no consequence for physically realizable signal angles of arrival. FIG. 8B shows the compensated antenna pattern 812 plotted versus the sine of the angle of the pattern, and as discussed above, the entire plot of FIG. 8B corresponds to the visible region which is shown in FIG. 8A. Comparing FIG. 8B with FIG. 3A shows that robust failed transducing element compensation has been achieved, in that the antenna pattern sidelobe levels are virtually identical between FIG. 8B and FIG. 3A.

The peak directivity gain for the patterns of FIG. 8A and FIG. 8B is 17.49 dB, which indicates that the failed element compensation process caused an aperture efficiency loss of 0.75 dB (0.75 dB more loss than with failures but without compensation). This loss is consistent with other known sidelobe reduction methods, which all result in losses in aperture efficiency. For many (if not all) antenna applications, incurring a 0.75 dB reduction in peak directivity gain in order to reduce sidelobe levels by 25 dB, and back to or nearly back to original levels, may be an acceptable and desirable performance tradeoff. The above example demonstrates that this invention is capable of robustly compensating for failed antenna transducing elements and providing antenna pattern sidelobe levels which are virtually identical to the original sidelobe levels without transducing element failures.

FIG. 8A and FIG. 8B show an exemplary antenna pattern which was compensated by Robust Failed-Element Compensation for an antenna beam scan angle of 0°. Robust Failed-Element Compensation can also be applied to other beam scan angles. Two methods are provided according to several aspects of the invention for applying Robust Failed-Element Compensation to non-zero-degree beam scan angles. Method (a) involves calculating unique compensated beamformer weights which utilize the degrees-of-freedom within the entire invisible regions for each beam scan angle, and Method (b) reserves a portion or portions of the invisible regions for beam scanning over limited angles and utilizes the degrees-of-freedom within the remaining portion or portions of the invisible regions for compensation.

Figure 9A:
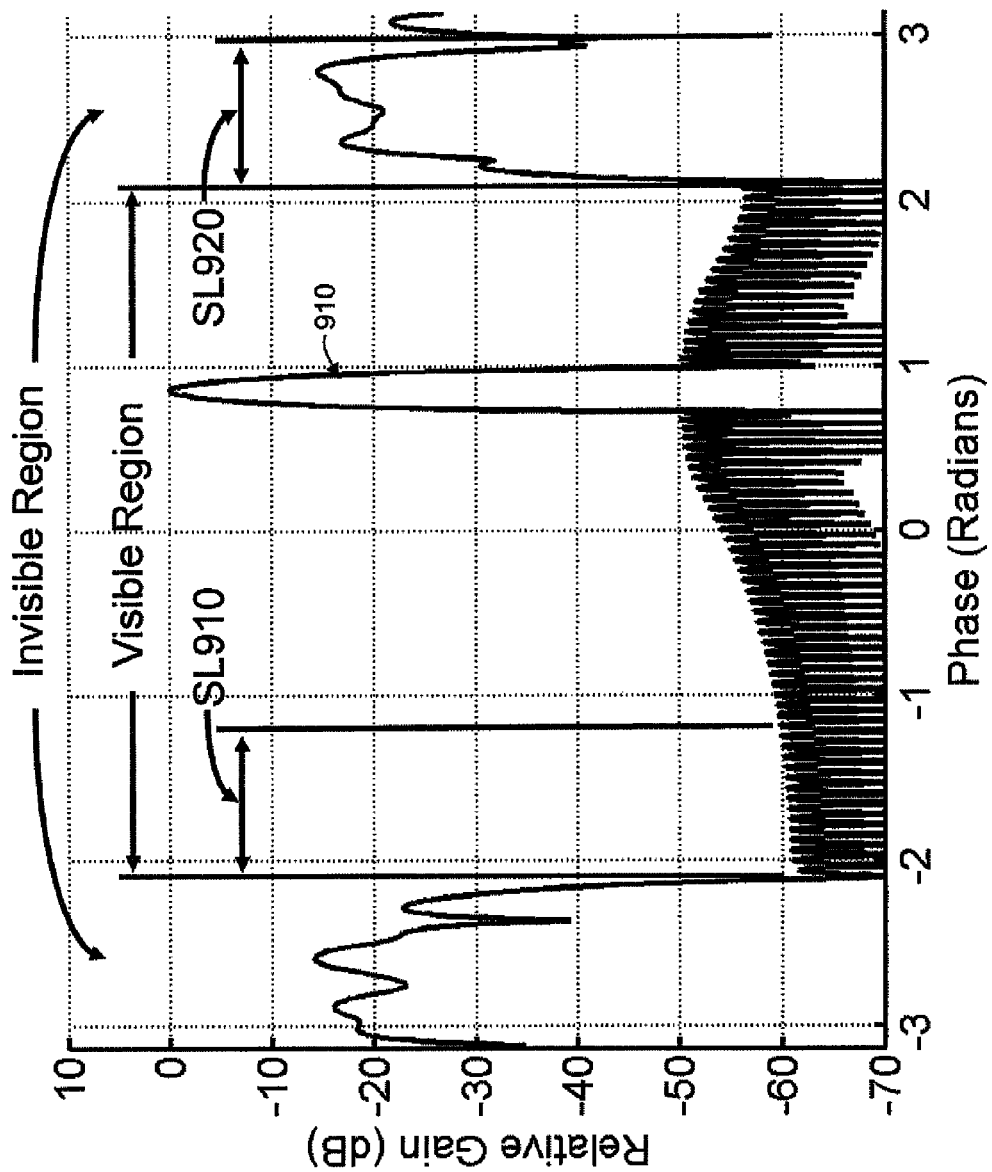
FIG. 9A is an illustration of an antenna pattern similar to that of FIG. 8A, but which is scanned to an angle of 24°.
Figure 9B:
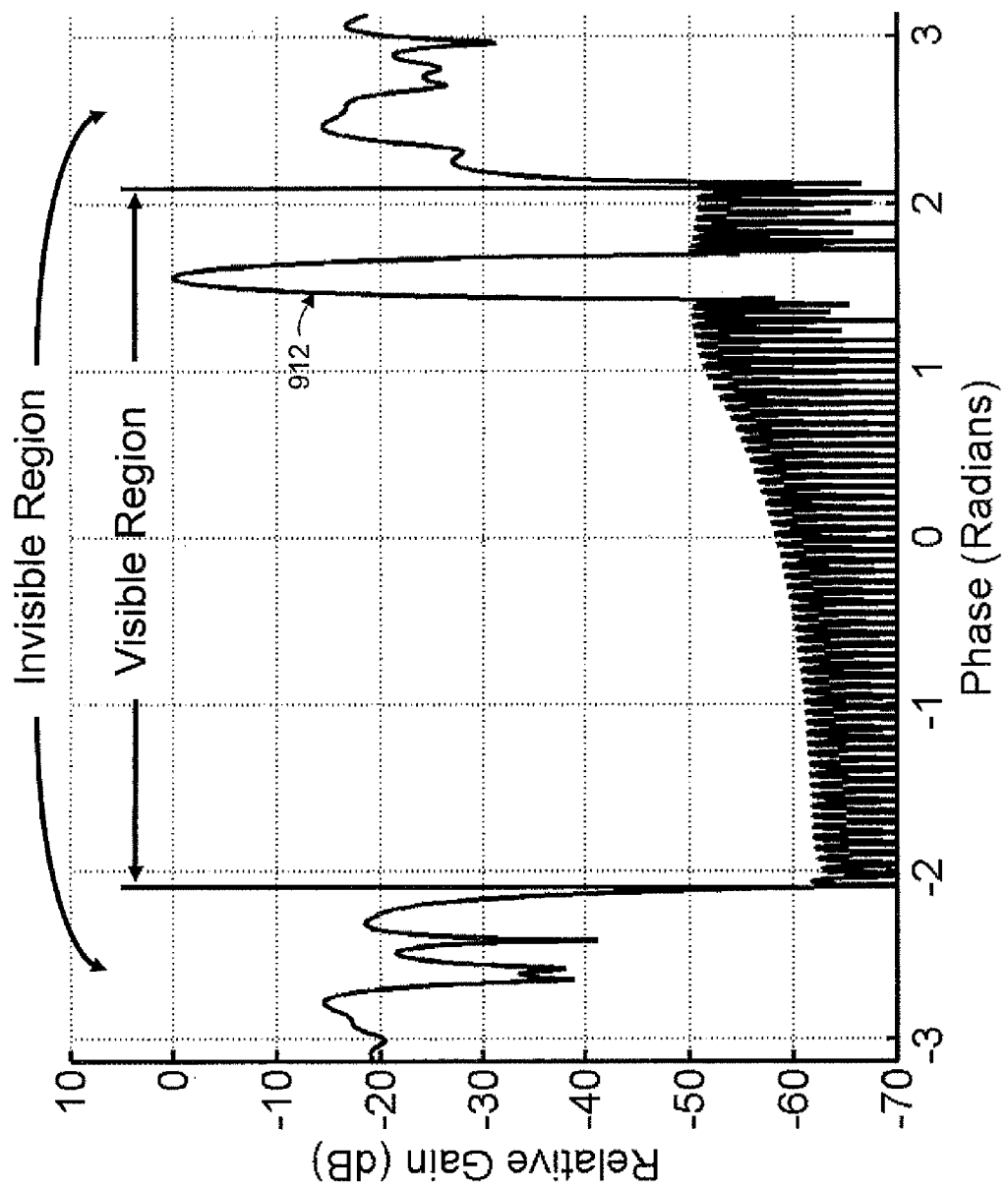
FIG. 9B is an illustration of an antenna pattern similar to FIG. 8A, but which is scanned to an angle of 48°.
Figure 9C:
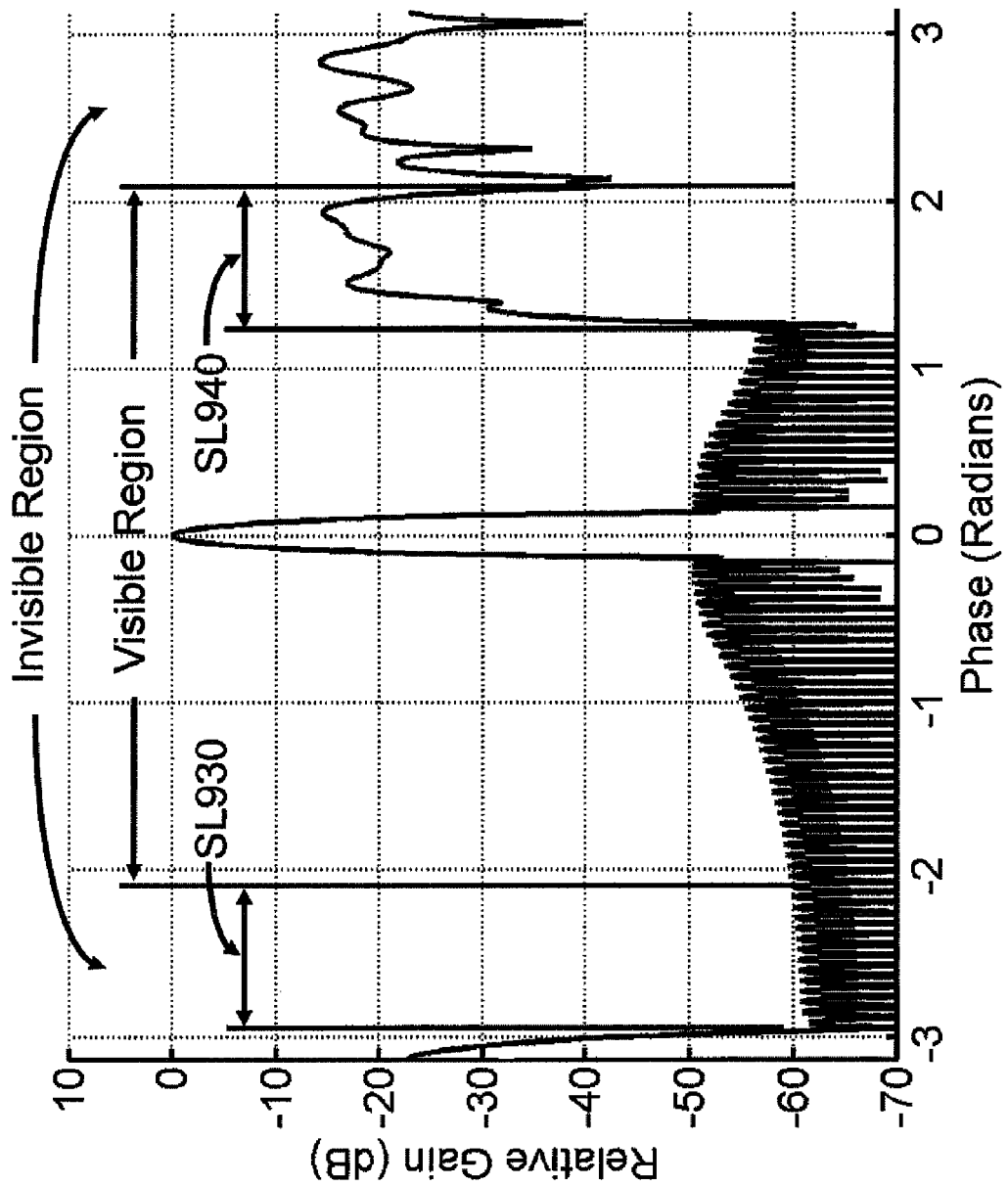
FIG. 9C is an illustration of an antenna pattern similar to FIG. 9A prior to being scanned.

Because Method (a) was used to compensate the antenna pattern for the beam scan angle of 0° which is shown in FIG. 8A, compensated low sidelobe levels are shown to exist over the entire visible region and elevated sidelobe levels exist over the entire invisible regions. (FIG. 8B also shows the compensated antenna pattern for the same case shown in FIG. 8A, but does not show the invisible region.) Elevated sidelobe levels exist over the entire invisible regions of FIG. 8A because the degrees-of-freedom within the entire invisible regions were utilized for compensation. For Method (a), unique compensated beam former weights are calculated for each beam scan angle. Examples of compensated antenna patterns for beam scan angles of 24° and 48° are shown in FIG. 9A and FIG. 9B, respectively. These examples are for the same exemplary transducing element failure case which applies for the compensated antenna pattern shown in FIG. 8A, namely, simultaneous failures of transducing elements numbered 21, 43, 50 and 63, of the 100-element linear array. Similar to FIG. 8A which applies for a beam scan angle of 0°, for both plots 910 of FIGS. 9A and 912 of FIG. 9B which apply for beam scan angles of 24° and 48°, respectively, compensated low sidelobe levels are shown to exist over the entire visible regions and elevated sidelobe levels exist over the entire invisible regions. Relative to Procedure A, Method (a) utilizes the beam space degrees-of-freedom within a shifted region of the antenna pattern in order to compensate for transducing element failures, and is implemented as a variation of Procedure A. The amount of shift is defined so the compensated low sidelobe region corresponds to the visible region after the beam is scanned to the desired direction. Specifically, whereas in Step Number 1 of Procedure A a set of phase values $\psi_k$, k=1, 2, 3, …, M are specified which span the invisible regions from −π to −2πδ/λ radians and from +2πδ/λ to +π radians, with Method (a) a set of phase values $\psi_k$ are specified which span the above regions but shifted by $-2\pi\delta/\lambda \sin(\theta)$ radians, where $\theta$ is the beam scan angle. That is, the set $\psi_k$ span the angular regions from $-\pi-2\pi\delta/\lambda \sin(\theta)$ to $-2\pi\delta/\lambda-2\pi\delta/\lambda \sin(\theta)$ radians and from $+2\pi\delta/\lambda-2\pi\delta/\lambda \sin(\theta)$ to $+\pi-2\pi\delta/\lambda \sin(\theta)$ radians. FIG. 9C shows an example of an antenna pattern with a shifted compensation region prior to being scanned to the desired direction, for the same exemplary case of simultaneous failures of transducing elements numbered 21, 43, 50 and 63 of the 100-element array as addressed previously. The example of FIG. 9C utilized regions for failed transducing element compensation which were shifted by an amount which corresponds to a scan angle $\theta$ of 24°. Because the regions which were utilized for failed transducing element compensation were shifted, both a low sidelobe region designated as SL930 in FIG. 9C exists in the invisible region and an elevated sidelobe region designated as SL940 in FIG. 9C exists in the visible region. The widths of regions SL930 and SL940 in FIG. 9C correspond to the exemplary scan angle of 24°. Note that the compensated antenna pattern in FIG. 9C has not yet been scanned to the desired direction. When the compensated antenna pattern shown in FIG. 9C is scanned to the desired direction of 24°, the entire pattern shown in FIG. 9C moves to the right as shown in FIG. 9A. (As a note, the portion of the antenna pattern which moved off of the right edge of FIG. 9C, moved onto the left edge of FIG. 9A.) Comparing FIG. 9C to FIG. 9A, it is seen that the low sidelobe region designated as SL930 in FIG. 9C has moved into the visible region and is designated as SL910 in FIG. 9A, and that the elevated sidelobe region designated as SL940 in FIG. 9C has moved into the invisible region and is designated as SL920 in FIG. 9A. This illustrates that shifting of the regions which are utilized for failed transducing element compensation according to Method (a) produces antenna patterns which have compensated low sidelobes over the entire visible regions after scanning of the antenna beams, and which utilize the beam space degrees-of-freedom within the entire invisible regions for compensation. In a similar manner, Method (a) may be applied to the scan angle case of 48° which is shown in FIG. 9B and to other scan angle cases (not illustrated).

Figure 10A:
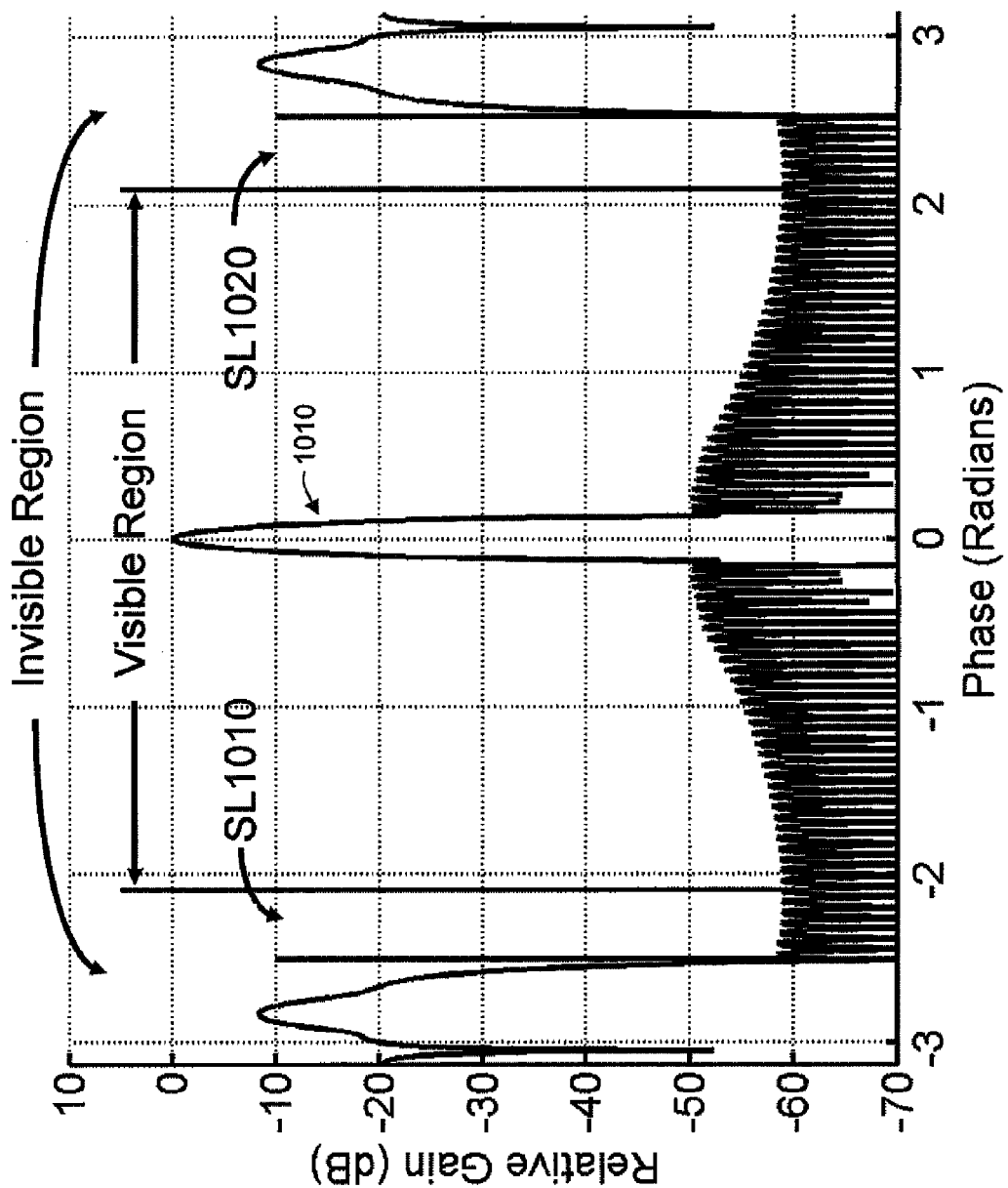
FIG. 10A illustrates an antenna pattern similar to that of FIG. 8A, in which the compensated low sidelobe region extends into the invisible region in order to reserve space for beam scanning.
Figure 10B:
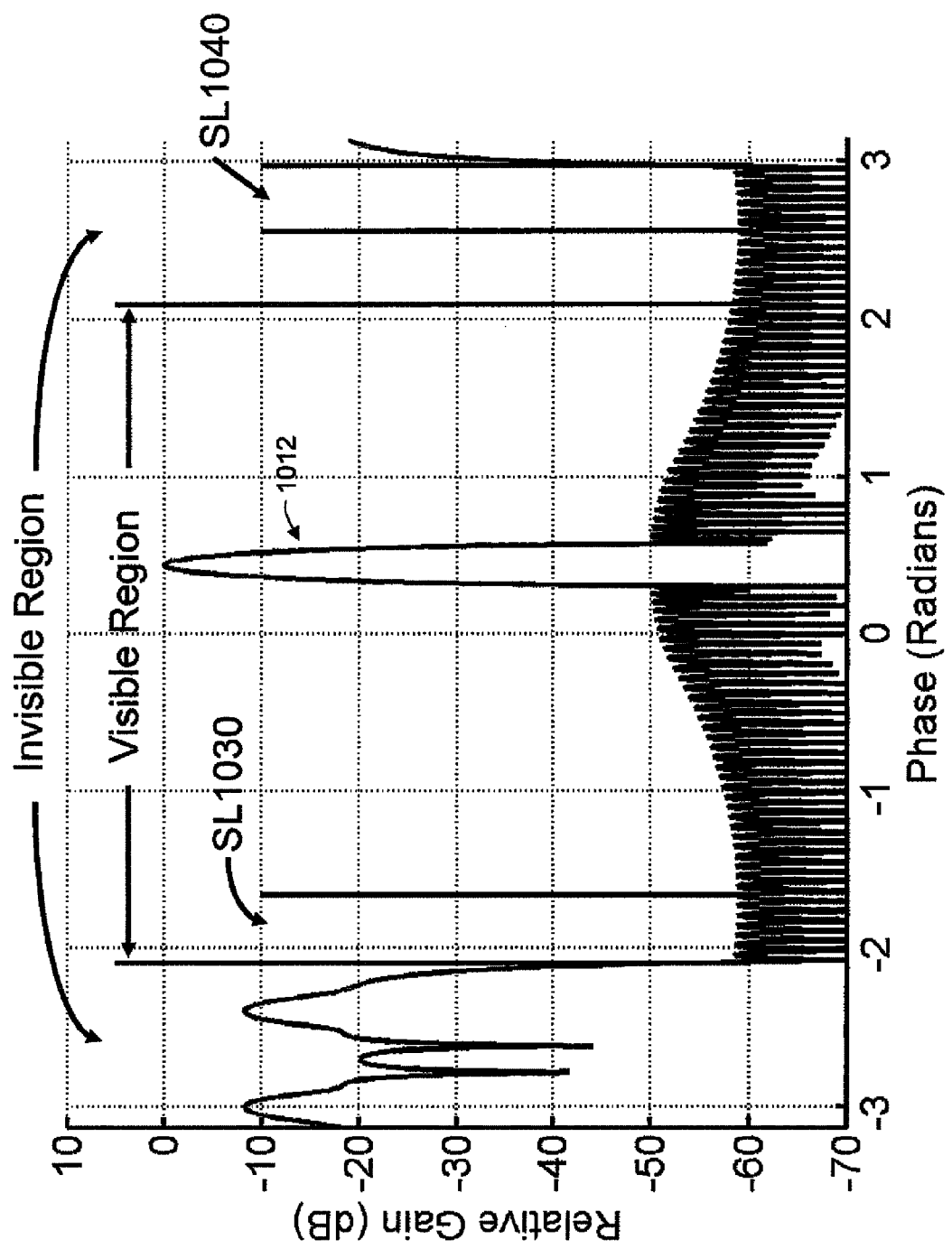
FIG. 10B illustrates the antenna pattern of FIG. 10A scanned to 12°.

With Method (b), a portion or portions of the invisible regions are reserved for beam scanning over limited angles and the degrees-of-freedom within the remaining portion or portions of the invisible regions are utilized for failed transducing element compensation. Additionally, the remaining portion or portions of the invisible regions which are utilized for failed transducing element compensation may be shifted as in the discussion of Method (a). FIG. 10A shows an exemplary antenna pattern 1010 which was obtained by applying Method (b) to the same exemplary 100-element case with failures of elements numbered 21, 43, 50 and 63, which applies for FIG. 8A. In FIG. 10A, the two portions of the invisible regions which were reserved for beam scanning are designated as SL1010 and SL1020, and the degrees-of-freedom within the remaining portions of the invisible regions were utilized for failed tranducing element compensation. Because beam space degrees-of-freedom within only the remaining portions of the invisible regions were utilized for compensation, the compensated low sidelobe region extends over the entire visible region and also extends over the sidelobe regions within the invisible regions which were reserved for scanning, designated as SL1010 and SL1020 in FIG. 10A. Relative to Procedure A, Method (b) utilizes the beam space degrees-of-freedom within the invisible regions, but reduced in size in order to accommodate beam scanning after compensation is applied. Specifically, whereas in Step Number 1 of Procedure A a set of phase values $\psi_k$, k=1, 2, 3, ..., M are specified which span the invisible regions from $-\pi$ to $-2\pi\delta/\lambda$ radians and from $+2\pi\delta/\lambda$ to $+\pi$ radians, with Method (b) a set of phase values $\psi_k$ are specified which span smaller regions. For antenna patterns which are to be compensated for failed transducing elements and then scanned by angles up to $\theta_b$, the widths of the reserved regions are $2\pi\delta/\lambda \sin(\theta_b)$ radians, and the portion or portions of the invisible regions which are utilized for failed transducing element compensation are reduced by this amount. That is, for Method (b) the set $\theta$, span the angular regions from $-\pi$ to $-2\pi\delta/\lambda-2\pi\delta/\lambda \sin(\theta_b)$ radians and from $+2\pi\delta/\lambda+2\pi\delta/\lambda \sin(\theta_b)$ to $+\pi$ radians. For the example of FIG. 10A the portions within the invisible regions which were reserved for scanning correspond to scan angles $\theta_b$ up to ±12° and are designated as SL1010 and SL1020. Because portions of the invisible regions were reserved for beam scanning, the same compensated weighting function Hc which was used for the 0° beam scan angle case shown in FIG. 10A may therefore be used for certain beam scan angles other than 0°. As an example, FIG. 10B shows the compensated antenna pattern 1012 similar to that of FIG. 10A, but which is scanned to an angle of 12°. Because the antenna pattern shown in FIG. 10B is a shifted (moved to the right) version of the antenna pattern shown in FIG. 10A, the portion of the antenna pattern designated as SL1030 in FIG. 10B corresponds to the portion of the antenna pattern designated as SL1010 in FIG. 10A. Because the sidelobe portion SL1010 in FIG. 10A was reserved for beam scanning and therefore had low compensated sidelobe levels, low compensated sidelobe levels were maintained over the entire visible region of FIG. 10B when the beam was scanned as shown. Low compensated sidelobe levels within the visible region are maintained for beam scan angles which are less than or as large as the portions of the invisible regions which are reserved for scanning. In a similar manner, the compensated weighting function Hc which was used for compensating the 0° beam scan angle case shown in FIG. 10A may also be used for beam scan angles in the opposite direction (not illustrated). The exemplary compensation weighting function Hc which was used for FIG. 10A and which was calculated by Method (b), can therefore be used for beam scan angles within the entire angular region from −12° to +12°.

Figure 10C:
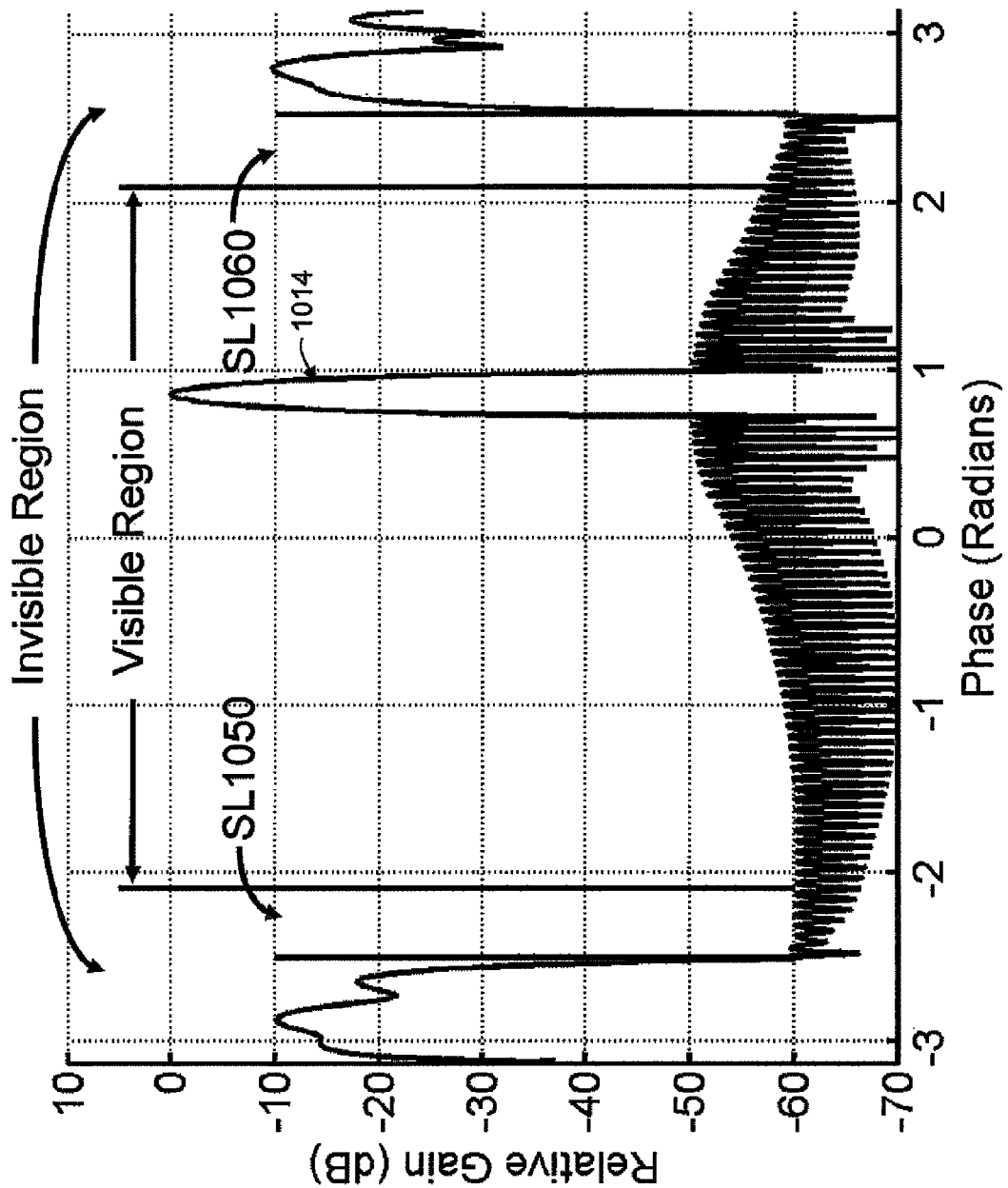
FIG. 10C is similar to FIG. 10A but is for a scan angle of 24°.
Figure 10D:
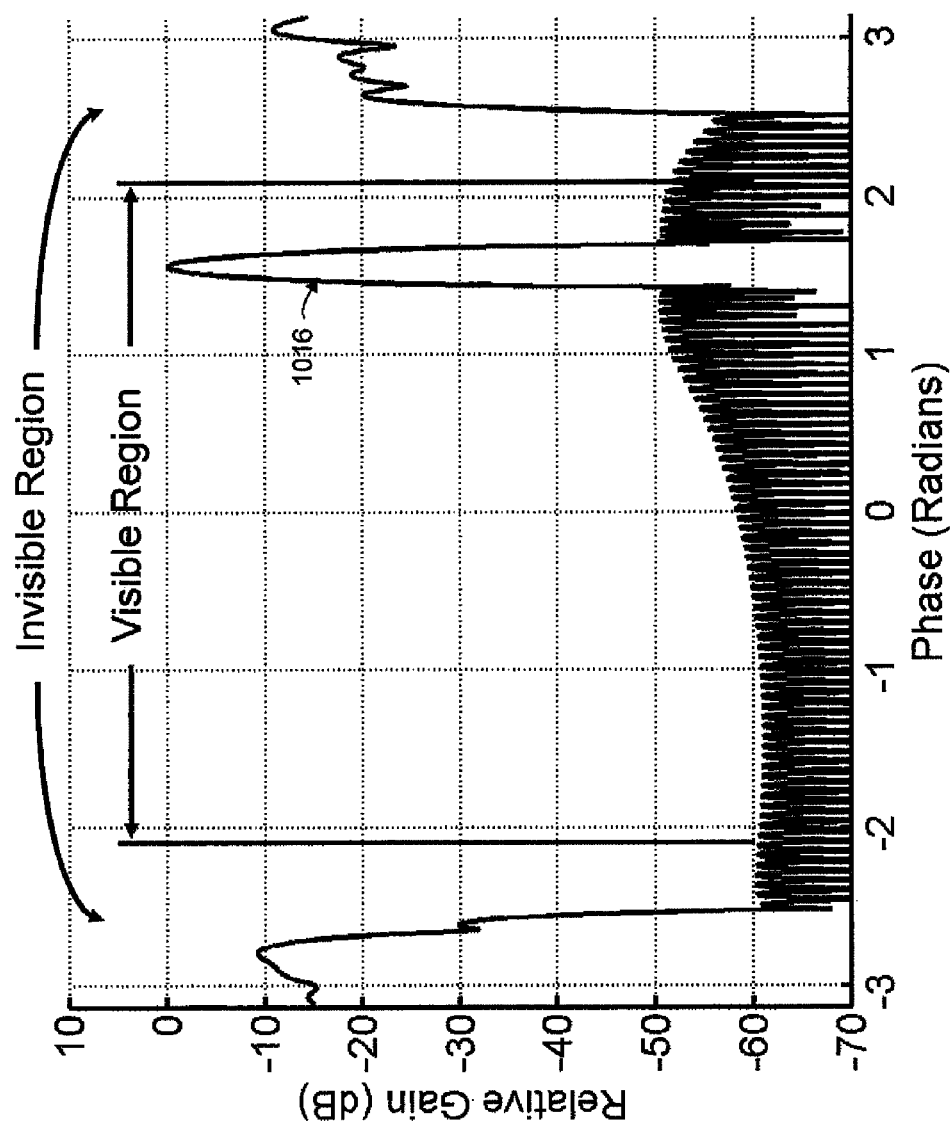
FIG. 10D is similar to FIG. 10A but is for a scan angle of 48°.
Figure 10E:
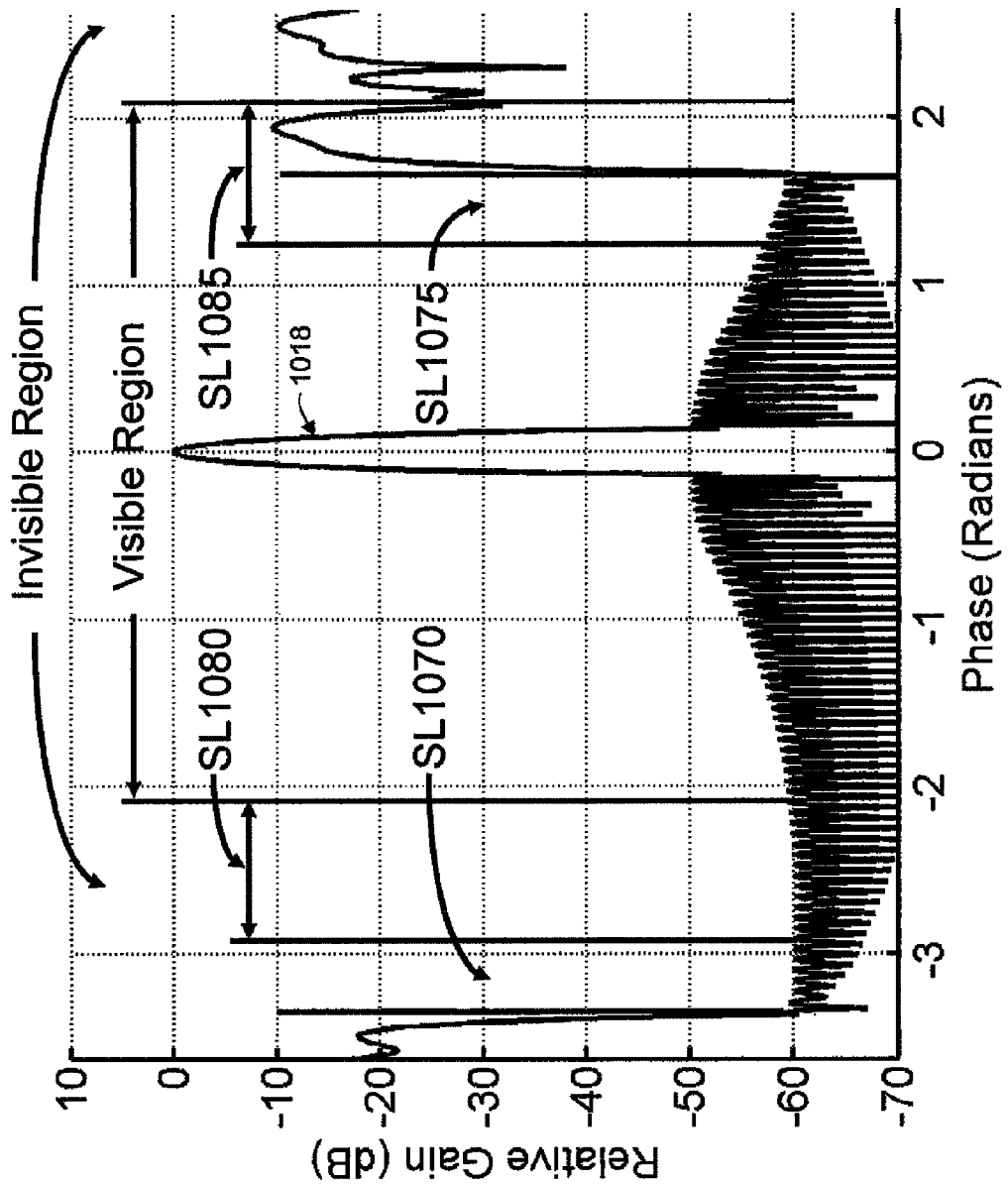
FIG. 10E illustrates a compensated antenna pattern prior to being scanned, with beam space reserved and shifted for scanning.

FIG. 10A shows an exemplary compensated antenna pattern for a 0° beam scan angle which reserved portions of the invisible regions for scanning of the beam up to ±12°. In a similar manner, FIG. 10C shows an exemplary compensated antenna pattern 1014 for a 24° beam scan angle which reserved portions of the invisible regions for additional scanning of the beam up to ±12°, or from 12° (24°−12°) to 36° (24°+12°). And FIG. 10D shows an exemplary compensated antenna pattern for a 48° beam scan angle which reserved portions of the invisible regions for additional scanning of the beam up to ±12°, or from 36° (48°−12°) to 60° (48°+12°). These examples show the use of 3 failed element compensation functions Hc to apply for all beam scan angles from 0° to 60°. For the examples of FIG. 10C and FIG. 10D, the regions of the antenna patterns which were utilized for failed element compensation were the invisible regions but which were first reduced in size by $2\pi\delta/\lambda \sin(\theta_b)$ radians, and which were then shifted by $2\pi\delta/\lambda \sin(\theta)$ radians as in the discussion of Method (a). That is, the set of phase values $\psi_k$, k=1, 2, 3, ..., M, which were utilized in Step Number 1 of procedure A span the regions from $-\pi-2\pi\delta/\lambda \sin(\theta)$ to $-2\pi\delta/\lambda-2\pi\delta/\lambda \sin(\theta_b)-2\pi\delta/\lambda \sin(\theta)$ radians and from $+2\pi\delta/\lambda-2\pi\delta/\lambda \sin(\theta_b)-2\pi\delta/\lambda \sin(\theta)$ to $+\pi-2\pi\delta/\lambda \sin(\theta)$ radians. FIG. 10E shows an example of an antenna pattern 1018 with reserved and shifted compensation regions prior to being scanned to the desired direction. The widths of the reserved regions $\theta_b$ are 12° and the value of $\theta$ is 24°. In FIG. 10E the reserved regions are designated as SL1070 and SL1075. The regions designated as SL1080 and SL1085 correspond to the amount of shift, which is $-2\pi\delta/\lambda \sin(\theta)$ radians. When the antenna pattern of FIG. 10E is scanned by 24°, it moves to the right as shown in FIG. 10C. Comparing FIG. 10E to FIG. 10C, it is seen that the regions designated as SL1070 and SL1075 in FIG. 10E have moved to the regions designated as SL1050 and SL1060, respectively, in FIG. 10C, and are thus correctly positioned to support the additional beam scanning of up to ±12° as in the above discussion of FIG. 10C. The 48° scan angle case illustrated in FIG. 10D was generated in a manner similar to the example for 24° which is discussed above, as can other scan angle cases (not illustrated).

In general, the number of compensated beamformer weighting functions which are needed to cover scan angle requirements for a given application depends on several design factors, such as (a) element-to-element spacing, which in turn controls the widths of the invisible regions (b) scan angle requirements (c) allowable losses in directivity, and (d) the number of failed transducing elements for which compensation is expected or required. This last factor affects the required size of (the required number of degrees-of-freedom in) the invisible regions which are utilized for failed transducing element compensation.

The above discussion was applied principally to linear array antennas. Extending the discussion to apply for planar array antennas involves, in part, the following: Planar array antenna beams can be scanned in two angular dimensions, so the phase shift for each transducing element is set to a value which accounts for both scan angles. Depending upon the element-to-element spacings of transducing elements in each dimension, invisible regions of the two-dimensional antenna spatial pattern may not exist at all, may exist within one dimension, may exist within the other dimension, or may exist within angular regions within both dimensions simultaneously. For planar arrays which have uncompensated weighting functions which are "separable", as defined by antenna terminology, aspects of the above discussion of the Failed-Element processor may be applied to each of the two dimensions separately. For two-dimensional or planar arrays which have uncompensated weighting functions which are "non-separable", as defined by antenna terminology, aspects of the above discussion of the Failed-Element Processor may be jointly applied to both dimensions simultaneously. The uncompensated weighting function illustrated in FIG. 6A, in the case of a planar array contains an uncompensated weighting coefficient for each signal which is received by, or which is sent to, each transducing element of the two-dimensional array, and the compensated weighting function Hc illustrated in FIG. 6B, contains a compensated weighting coefficient for each signal which is received by, or which is sent to, each transducing element of the two-dimensional array. Each column of entries in matrix G illustrated in FIG. 6C, constitutes a column vector which corresponds to the corresponding individual coefficients in the uncompensated weighting function H which is illustrated in FIG. 6A. And each row of entries in matrix G which is illustrated in FIG. 6C, corresponds to a combination of angles in two dimensions, which span the invisible regions of the two-dimensional spatial antenna pattern, and which invisible regions contain the beam space degrees-of-freedom which are utilized for failed transducing element compensation. The equations which describe array antenna beam scanning in two dimensions are a straightforward extension of equation (1), are well understood by those skilled in the arts of antennas and are not illustrated here. As in the discussion for linear array antennas, the uncompensated weighting function H in block 32 of FIG. 1 and illustrated in FIG. 6A, may be any prior art. Extending equation (4) to apply for angles in two dimensions in order to calculate entries within matrix G in block 730 of FIG. 7 and illustrated in FIG. 6C, is also well understood by those skilled in the arts of antennas, and is not illustrated here. Similarly, Procedure A and Procedure B which discuss the utilization of beam space degrees-of-freedom within invisible regions and within visible regions, respectively, for failed element compensation, and Method (a) and Method (b) which discuss scanning of antenna beams which are compensated for failed elements, all apply for planar arrays. And finally, with the above discussion on generating entries in matrix G of block 730 of FIG. 7 and illustrated in FIG. 6C, for antenna angles in two dimensions, the above discussion of the implementation of the Failed-Element processor in block 38 of FIG. 7 also applies for planar arrays.

Various aspects of the invention help to solve or ameliorate the problems of degradations of sidelobe levels attributable to antenna transducing element failures. An aspect of the invention includes a process or method for compensating antenna beamformer weights in order to utilize specific antenna redundancy properties. Failed antenna transducing elements are compensated in a manner which essentially does not cause or causes only minor corresponding degradations of pattern sidelobe levels in transmission and/or reception, and which may allow array antennas to meet stringent performance requirements with high transducing element failure rates.

By comparison with prior-art methods for handling failed transducing elements by simply increasing the sizes of the antenna arrays in order to reduce the contributions of individual element failures, aspects of the present invention are superior, because increasing the sizes of the antenna arrays is unacceptable for many antenna applications. For relatively small antennas, all elements are inherently significant and reasonable size increases are useful only if the required sidelobe levels are modest. For large antennas, reasonable size increases are useful but only for small numbers of element failures. A fixed element' failure percentage tends to produce the same degradations of sidelobe levels regardless of the sizes of the antenna arrays. And, regardless of antenna size, simply increasing the size reduces, but does not eliminate, sidelobe level degradations. Additionally, increasing the size of the antenna is a costly proposition for many antenna applications. The cost and modest performance improvements of increasing the antenna size are serious shortcomings for many antenna applications. In addition to not needing increases in antenna sizes, the Robust Failed-Element Processor can provide antenna pattern sidelobe levels which are virtually identical to those of the antenna patterns without failures. And, while the Robust Failed-Element Processor may require element spacings which are less than one-half of the transmitted or received signal wavelengths, this requirement is already met in many antenna array architectures without regard to failed element compensation, because it is driven by the need to maximize element count for purposes of maximizing transmit power. It should be noted that, for antenna arrays which are sized large enough so that a few failed elements do not significantly degrade pattern sidelobe levels, incorporation of aspects of the Robust Failed-Element Processor may allow these same antennas to operate with much higher element failure rates.

Thus, according to an aspect of the invention, linear and planar array antenna configurations have transducing elements which are spaced less than one-half of the free-space transmit or receive signal wavelengths in order to provide desired antenna properties. Specifically, the spacings provide transducing element redundancy and also provide redundant antenna beam space degrees-of-freedom, degrees-of-freedom which are beyond those needed to produce desired antenna beam shape and sidelobe levels in realizable space in the absence of transducing element failures. When antenna transducing elements fail, the Robust Failed-Element Processor compensates by calculating new beam former weight values which utilize the redundant beam space degrees-of-freedom. The compensated antenna pattern sidelobe levels in the visible region are virtually identical to those of the patterns without failures, because compensation utilizes the redundant beam space degrees-of-freedom, not the degrees-of-freedom within the antenna visible region or realizable space.

Other embodiments of the invention will be apparent to those skilled in the art. For example, the Robust Failed-Element Processor can be implemented as a set of discrete modules, with each module implementing separate processing steps, or as a software program in a general-purpose computer. Other embodiments may include interchange of the orders of certain processing steps or the use of equivalent variations of mathematical computation. Aspects of the invention may be used in radar applications, sonar applications, communications antennas, and in other applications requiring arrays of sensing elements. Further variations include applications of the invention to conformal array antennas and to other antenna configurations which are neither linear nor planar arrays.

What is claimed is:

1. A method for generating a beam from an antenna, said method comprising the steps of:
   providing an array antenna including antenna transducing elements spaced at less than one-half wavelength, whereby the element-to-element phase shift defines visible and invisible regions for the antenna beam spatial pattern;
   applying uncompensated weights to signals of said antenna transducing elements of said array antenna when no antenna elements have failed, so as to provide a specified sidelobe level distribution;
   identifying at least one failed antenna transducing element of said antenna transducing elements;
   in the presence of said at least one failed antenna transducing elements, which degrade the sidelobe levels, applying compensated weights to said signals of said antenna transducing elements of said array antenna so as to place a principal portion of the degradation of said side lobe levels into said invisible region, whereby the side lobe levels within said visible region are maintained at said specified sidelobe level.

2. A method according to claim 1, wherein said step of applying compensated weights to said signals of said antenna transducing elements of said array antenna so as to place the principal, portion of the degradation of said sidelobe levels into said invisible region comprises the step of applying compensated weights to said signals of said antenna transducing elements of said array antenna so as to place the principal portion of the degradation of said sidelobe levels into a first portion of said invisible region remote from said visible region.

3. A method according to claim 2, wherein said first portion of said invisible region is spaced apart from said visible region by a second portion of said invisible region having a selected range of phase shifts, the method further comprising the step of:
   adjusting an element-to-element phase shift so as to scan said antenna beam and to move at least a part of said second portion of said invisible region into said visible region.

4. A method according to claim 1 wherein said step of applying compensated weights comprises the steps of:
   generating a mathematical matrix in which each column of the mathematical matrix corresponds to an antenna transducing element;
   selecting columns of said mathematical matrix which correspond to failed antenna transducing elements in order to form selected column vectors;
   orthogonalizing said selected column vectors in order to remove overlapping components to thereby generate orthogonalized vectors;
   selecting weight values of said uncompensated weights which correspond to the failed antenna transducing elements of the antenna in order to form corresponding weight values;
   processing said corresponding weight values analogously to the orthogonalization processing of the selected column vectors in order to generate processed corresponding weight values;
   normalizing said processed corresponding weight values to thereby generate normalized corresponding weight values;
   calculating mathematical inner products of said orthogonalized vectors and the vectors which comprise the columns of said mathematical matrix in order to generate new vectors;
   multiplying each of said new vectors by said normalized corresponding weight value in order to generate scaled new vectors; and
   subtracting each said scaled new vector from said uncompensated weights in order to calculate the compensated weights.

5. A method according to claim 4, wherein said step of generating a mathematical matrix in which each column of the mathematical matrix corresponds to an antenna transducing element comprises the steps of:
   generating column vectors which span angular region(s) of an antenna pattern which correspond to said invisible region(s) or to specified regions(s) of the antenna pattern in order to form generated column vectors; and
   concatenating said generated column vectors so that each generated column vector constitutes a column of a matrix in order to form a mathematical G matrix, said G matrix including N columns, where the number of columns N is the same as the total number of antenna transducing elements, said G matrix also including M rows where the number of rows M corresponds to a number of vectors which are chosen to span the angular region(s) of the antenna pattern which correspond to said invisible regions(s) or to specified region(s) of the antenna pattern.

6. A method according to claim 5 for generating column vectors, wherein the generation of said column vectors comprising the steps of:
   using the uncompensated weights; and,
   using phase values which span an angular region or regions of the antenna spatial pattern which is or are supplementary to the angular region or regions; and,
   where the phase values which span the supplementary angular region or regions are spaced no farther apart than $2\pi l/N$ radians.

7. A method for receiving signals or transmitting signals with an antenna which can be compensated for performance degradations which are due to failed antenna transducing elements, said method comprising the steps of:

receiving signals from, or transmitting signals into, free space using an antenna comprising an array of antenna transducing elements;

applying uncompensated weights to signals of said antenna transducing elements in order to control sidelobe levels of the antenna in the absence of antenna transducing element failures;

identifying at least one failed antenna transducing element; for degradations of sidelobe levels attributable to said at least one failed antenna transducing elements;

applying compensated weights to signals of said antenna transducing elements in order to adjust and compensate for said at least one failed antenna transducing elements; and combining or adding signals for receiving signals from free space, or splitting or separating signals for transmitting signals into free space.

8. A method according to claim 7 whereby said step of using an antenna comprising an array of antenna elements includes the step of using a linear array of antenna elements; and said step of applying compensated weights for said at least one failed antenna transducing elements is applied to said linear array of antenna elements.

9. A method according to claim 7 whereby compensation for said at least one failed antenna transducing elements is applied to each dimension of multi-dimensional array antennas.

10. A method according to claim 7 wherein said step of calculating compensated weights uses information of which antenna transducing elements have failed along with the uncompensated weights and a mathematical matrix which has elements which are specified by a set of angle values which span supplement(s) of specified angular region(s) of antenna pattern.

11. A method according to claim 10 wherein said step of calculating compensated weights includes the steps of:

generating column vectors which correspond to the antenna transducing elements in order to form generated column vectors; and concatenating said generated column vectors in order to form a mathematical matrix in which each column of the mathematical matrix corresponds to a generated column vector;

selecting columns of said mathematical matrix which correspond to the at least one failed antenna transducing elements in order to form selected column vectors;

orthogonalizing said selected column vectors in order to remove overlapping components to thereby generate orthogonalized vectors;

selecting weight values of the uncompensated weights which correspond to the at least one failed antenna transducing elements in order to form corresponding weight values;

processing said corresponding weight values analogously to the orthogonization processing of the selected column vectors in order to form processed corresponding weight values;

normalizing said processed corresponding weight values in order to form normalized corresponding weight values;

calculating mathematical inner products of said orthogonalized vectors and the vectors which comprise the columns of the mathematical matrix in order to form new vectors;

multiplying each said new vector by said normalized corresponding weight value in order to generate scaled new vectors; and, subtracting each said scaled new vector from the uncompensated weights in order to calculate the compensated weights.

12. A method according to claim 7 wherein for an antenna which has element spacings which are less than one-half of the wavelengths of operational radio frequencies of the antenna, said step of calculating compensated weights uses information of which elements have failed along with the uncompensated weights and a mathematical matrix which has elements which are specified by a set of phase values which span a phase region or regions which is or are supplementary to a region of phase values which steer the antenna beam over an entire visible angular region of the antenna.

13. A method according to claim 12 wherein said step of calculating compensated weights includes the steps of:

generating column vectors which correspond to the antenna transducing elements in order to form generated column vectors; and, concatenating said generated column vectors in order to form a mathematical matrix in which each column of the mathematical matrix corresponds to a generated column vector;

selecting columns of said mathematical matrix which correspond to the at least one failed transducing elements of the antenna in order to form selected column vectors;

orthogonalizing said selected column vectors in order to remove overlapping components to thereby generate orthogonalized vectors;

selecting weight values of the uncompensated weights which correspond to the at least one failed transducing element in order to form corresponding weight values;

processing said corresponding weight values analogously to the orthogonalization processing of the selected column vectors to thereby generate processed corresponding weight values;

normalizing said processed corresponding weight values in order to generate normalized corresponding weight values;

calculating mathematical inner products of said orthogonalized vectors and the vectors which comprise the columns of the matrix in order to generate new vectors;

multiplying each said new vector by said normalized corresponding weight value in order to generate scaled new vectors; and, subtracting each said sealed new vector from the uncompensated weights in order to calculate the compensated weights.

14. A method for generating a beam from an antenna, said method comprising the steps of:

providing an array antenna including antenna transducing elements, the array antenna defining an antenna spatial pattern with visible and invisible regions;

applying uncompensated weights to signals of said antenna transducing elements of said array antenna to provide a sidelobe level distribution;

identifying any failed elements of said antenna transducing elements;

applying compensated weights to signals of said antenna transducing elements of said array antenna wherein one or more of said antenna transducing elements are identified as failed elements, so as to place at least a portion of any degraded sidelobe levels into said invisible region.

15. A system for receiving signals or transmitting signals with an antenna which can be compensated for performance degradations which are due to failed antenna transducing elements, said system comprising:
- a processor executing instructions for performing the steps of:
  - receiving signals from, or transmitting signals into, free space using an antenna comprising an array of antenna transducing elements;
  - applying uncompensated weights to signals of said antenna transducing elements in order to control sidelobe levels of the antenna in the absence of antenna transducing element failures;
  - identifying at least one failed antenna transducing element;
  - for degradations of sidelobe levels attributable to said at least one failed antenna transducing element;
    - applying compensated weights to signals of said antenna transducing elements in order to adjust and compensate for said at least one failed antenna transducing element; and
    - combining or adding signals for receiving signals from free space, or splitting or separating signals for transmitting signals into free space.

16. A system according to claim 15 whereby said step of using an antenna comprising an array of antenna elements includes the step of using a linear array of antenna elements; and
said step of applying compensated weights for said at least one failed antenna transducing element is applied to said linear array of antenna elements.

17. A system according to claim 15 whereby compensation for said at least one failed antenna transducing element is applied to each dimension of multi-dimensional array antennas.

18. A system according to claim 15 wherein said step of calculating compensated weights uses information of which antenna transducing elements have failed along with the uncompensated weights and a mathematical matrix which has elements which are specified by a set of angle values which span supplement(s) of specified angular region(s) of antenna pattern.

19. A system according to claim 18 wherein said step of calculating compensated weights includes the steps of:
- generating column vectors which correspond to the antenna transducing elements in order to form generated column vectors; and
- concatenating said generated column vectors in order to form a mathematical matrix in which each column of the mathematical matrix corresponds to a generated column vector;
- selecting columns of said mathematical matrix which correspond to the at least one failed antenna transducing element in order to form selected column vectors;
- orthogonalizing said selected column vectors in order to remove overlapping components to thereby generate orthogonalized vectors;
- selecting weight values of the uncompensated weights which correspond to the at least one failed antenna transducing element in order to form corresponding weight values;
- processing said corresponding weight values analogously to the orthogonization processing of the selected column vectors in order to form processed corresponding weight values;
- normalizing said processed corresponding weight values in order to form normalized corresponding weight values;
- calculating mathematical inner products of said orthogonalized vectors and the vectors which comprise the columns of the mathematical matrix in order to form new vectors;
- multiplying each said new vector by said normalized corresponding weight value in order to generate scaled new vectors; and,
- subtracting each said scaled new vector from the uncompensated weights in order to calculate the compensated weights.

20. A system according to claim 15 wherein for an antenna which has element spacings which are less than one-half of the wavelengths of operational radio frequencies of the antenna, said step of calculating compensated weights uses information of which elements have failed along with the uncompensated weights and a mathematical matrix which has elements which are specified by a set of phase values which span a phase region or regions which is or are supplementary to a region of phase values which steer the antenna beam over an entire visible angular region of the antenna.

* * * * *